(12) United States Patent
Silverbrook et al.

(10) Patent No.: US 7,091,960 B1
(45) Date of Patent: Aug. 15, 2006

(54) CODE SENSOR ATTACHMENT FOR PEN

(75) Inventors: Kia Silverbrook, Balmain (AU); Paul Lapstun, Rodd Point (AU); Tobin Allen King, Cremorne (AU)

(73) Assignee: Silverbrook Research Pty Ltd, Balmain (AU)

( * ) Notice: Subject to any disclaimer, the term of this patent is extended or adjusted under 35 U.S.C. 154(b) by 447 days.

(21) Appl. No.: 09/722,172

(22) Filed: Nov. 25, 2000

(30) Foreign Application Priority Data

Feb. 24, 2000 (AU) .................................... PQ5829

(51) Int. Cl.
*G09G 5/00* (2006.01)

(52) U.S. Cl. ..................... 345/173; 345/179; 178/19.01

(58) Field of Classification Search ................ 345/179, 345/180, 181, 182, 183, 173, 166, 176, 175; 178/19.01, 18.09, 18.03, 18.04; 382/187, 382/186, 184; 717/106; 715/768
See application file for complete search history.

(56) References Cited

U.S. PATENT DOCUMENTS

| | | | | |
|---|---|---|---|---|
| 4,052,713 A | * | 10/1977 | Lytle et al. | ............... 346/140.1 |
| 4,864,618 A | | 9/1989 | Wright et al. | |
| 5,051,736 A | | 9/1991 | Bennett et al. | |
| 5,321,559 A | * | 6/1994 | Nguyen et al. | ................ 360/46 |
| 5,340,968 A | * | 8/1994 | Watanabe et al. | ............ 235/380 |
| 5,340,972 A | * | 8/1994 | Sandor | ......................... 235/472 |
| 5,422,760 A | * | 6/1995 | Abbott et al. | ................... 360/46 |
| 5,434,370 A | * | 7/1995 | Wilson et al. | ............ 178/19.01 |
| 5,477,012 A | | 12/1995 | Sekendur | |
| 5,652,412 A | | 7/1997 | Lazzouni | |
| 5,661,506 A | | 8/1997 | Lazzouni et al. | |
| 5,692,073 A | | 11/1997 | Cass | |
| 5,774,602 A | | 6/1998 | Taguchi et al. | |
| 5,852,434 A | | 12/1998 | Sekendur | |
| 5,875,108 A | * | 2/1999 | Hoffberg et al. | ............... 700/17 |
| 5,914,708 A | * | 6/1999 | LaGrange et al. | ........... 345/179 |
| 5,939,702 A | * | 8/1999 | Knighton et al. | ....... 235/472.03 |
| 5,979,758 A | * | 11/1999 | Swartz et al. | ................ 235/383 |
| 6,048,124 A | * | 4/2000 | Kawabe | ....................... 401/243 |
| 6,076,734 A | | 6/2000 | Dougherty et al. | |
| 6,152,370 A | * | 11/2000 | Ackley | ................... 235/462.01 |
| 6,243,503 B1 | * | 6/2001 | Teufel et al. | ................ 382/312 |
| 6,252,182 B1 | * | 6/2001 | Lai | ........................... 178/19.04 |
| 6,323,846 B1 | * | 11/2001 | Westerman et al. | .......... 345/173 |
| 6,377,249 B1 | * | 4/2002 | Mumford | ..................... 345/179 |

FOREIGN PATENT DOCUMENTS

| | | |
|---|---|---|
| EP | 0266189 A | 5/1988 |
| EP | 0493936 A | 7/1992 |

(Continued)

OTHER PUBLICATIONS

Dymetman, M., and Copperman, M., Intelligent Paper; in Electronic Publishing, Artistic Imaging, and Digital Typography, Proceedings of EP '98, Mar./Apr. 1998, Springer Verlag LNCS 1375, pp. 392-406.

*Primary Examiner*—Richard Hjerpe
*Assistant Examiner*—Abbas I. Abdulselam

(57) ABSTRACT

A sensing device for use with a surface having coded data disposed on the surface, the coded data being indicative of an identity of a region associated with the surface, said device including detection means arranged to detect the coded data and to generate region identity data indicative of the identity of the region using the coded data, and attachment means for facilitating attachment of the device to a writing implement.

14 Claims, 24 Drawing Sheets

FOREIGN PATENT DOCUMENTS

| | | |
|---|---|---|
| GB | 2 306 669 | 5/1997 |
| JP | 08101739 A | 4/1996 |
| JP | 09-022439 * | 1/1997 |
| WO | WO 99/18487 | 4/1999 |

* cited by examiner

CODE SENSOR ATTACHMENT FOR PEN

FIELD OF INVENTION

The present invention relates generally to a sensing device for capturing interactions with and movement relative to a surface, and more particularly, to a sensing device attachable to a stylus or marking implement such as a pen, pencil or eraser.

CO-PENDING APPLICATIONS

Various methods, systems and apparatus relating to the present invention are disclosed in the following co-pending applications filed by the applicant or assignee of the present invention on Nov. 25, 2000: Ser. Nos. 09/721,895, 09/721,894, 09/722,174, 09/721,896, 09/722,148, 09/722,146, 09/721,861, 09/721,892, 09/722,171, 09/721,858, 09/722,142, 09/722,087, 09/722,141, 09/722,175, 09/722,147, 09/722,172, 09/721,893, 09/722,088, 09/721,862, U.S. Pat. No. 6,530,339, Ser. Nos. 09/721,857, 09/721,859, 09/721,860

The disclosures of these co-pending applications are incorporated herein by reference.

Various methods, systems and apparatus relating to the present invention are disclosed in the following co-pending applications filed by the applicant or assignee of the present invention on Oct. 20, 2000: Ser. Nos. 09/693,415, 09/693,219, 09/693,280, 09/693,515, 09/693,705, 09/693,647, 09/693,690, 09/693,593, U.S. Pat. No. 6,474,888, Ser. Nos. 09/693,341, 09/696,473, 09/696,514, U.S. Pat. No. 6,454,482, Ser. No. 09/693,704, U.S. Pat. Nos. 6,527,365, 6,474,773, Ser. No. 09/693,335

The disclosures of these co-pending applications are incorporated herein by reference.

Various methods, systems and apparatus relating to the present invention are disclosed in the following co-pending applications filed by the applicant or assignee of the present invention on Sep. 15, 2000: Ser. Nos. 09/663,579, 09/669,599, 09/663,701 09/663,640.

The disclosures of these co-pending applications are incorporated herein by reference.

Various methods, systems and apparatus relating to the present invention are disclosed in the following co-pending applications filed by the applicant or assignee of the present invention on Jun. 30, 2000: Ser. Nos. 09/609,139, 09/608,970, 09/609,039, 09/607,852, 09/607,656, 09/609,132, 09/609,303, 09/610,095, 09/609,596, 09/607,843, 09/607,605, 09/608,178, 09/609,553, 09/609,233, 09/609,149, 09/608,022, 09/609,232, 09/607,844, U.S. Pat. No. 6,457,883, Ser. Nos. 09/608,920, 09/607,985, U.S. Pat. Nos. 6,398,332, 6,394,573, 6,622,923

The disclosures of these co-pending applications are incorporated herein by reference.

Various methods, systems and apparatus relating to the present invention are disclosed in the following co-pending applications filed by the applicant or assignee of the present invention on 23 May 2000: U.S. Ser. Nos. 09/575,197, 09/575,195, 09/575,159, 09/575,132, 09/575,123, 09/575,148, 09/575,130, 09/575,165, 09/575,153, 09/575,118, 09/575,131, 09/575,116, 09/575,144, 09/575,139, 09/575,186, 09/575,185, 09/575,191, 09/575,145, 09/575,192, 09/575,181, 09/575,193, 09/575,156, 09/575,183, 09/575,160, 09/575,150, 09/575,169, 09/575,184, U.S. Pat. Nos. 6,502,614, 6,622,999, U.S. Ser. Nos. 09/575,149, U.S. Pat. No. 6,549,935, U.S. Ser. Nos. 09/575,187, 09/575,155, U.S. Pat. Nos. 6,591,884, 6,439,706, U.S. Ser. Nos. 09/575,196, 09/575,198, 09/575,178, U.S. Pat. No. 6,428,155, U.S. Ser. Nos. 09/575,146, 09/575,174, 09/575,163, 09/575,168, 09/575,154, 09/575,129, 09/575,124, 09/575,188, 09/575,189, 09/575,162, 09/575,172, 09/575,170, 09/575,171, 09/575,161, U.S. Pat. Nos. 6,428,133, 6,527,365, 6,315,399, 6,338,548, 6,540,319, 6,328,431, 6,328,425, U.S. Ser. No. 09/575,127, U.S. Pat. Nos. 6,383,833, 6,464,332, 6,390,591, U.S. Ser. No. 09/575,152, U.S. Pat. Nos. 6,328,417, 6,409,323, 6,281,912, 6,604,810, 6,318,920, 6,488,422, U.S. Ser. Nos. 09/575,108, 09/575,109, 09/575,110.

The disclosures of these co-pending applications are incorporated herein by reference.

BACKGROUND

Self-contained pen-like devices have been described which mark a surface while simultaneously capturing their own movement relative to the surface. Some such devices sense their own movement using embedded accelerometers. Others sense their own movement by detecting information which is machine-readably encoded on the surface. In this latter category, see for example U.S. Pat. No. 5,477,012, U.S. Pat. No. 5,652,412 and PCT application WO99/50787.

Since these pen-like devices typically include an integral marking means, they support only a limited set of marking modes or styles.

SUMMARY OF INVENTION

In accordance with a first aspect of the present invention, there is provided a sensing device for use with a surface having coded data disposed on the surface, the coded data being indicative of an identity of a region associated with the surface, said device including detection means arranged to detect the coded data and to generate region identity data indicative of the identity of the region using the coded data, and attachment means for facilitating attachment of the device to a writing implement.

Preferably, the attachment means is adapted to facilitate attachment and detachment of the device to a writing implement.

Preferably, the attachment means is a clamp.

Preferably also, the device includes means for ensuring correct orientation of the device when the writing implement is held by a user during use. Said means for ensuring correct orientation of the device may be a grip portion configured so as to correspond with a portion of a user's hand.

Preferably, the sensing device includes calibration means for calibrating the device such that information indicative of the distance between a writing portion of the writing implement and the detection means is incorporated into said region identity data.

Preferably, the attachment means is adapted to facilitate attachment of the device to a pen, marker or pencil.

Preferably, the sensing device includes motion sensing means configured to generate movement data indicative of movement of the sensing device relative to the region.

Preferably, the motion sensing means is configured to generate the movement data using the coded data.

In an alternative embodiment, the motion sensing means includes at least one acceleration sensing means, the acceleration sensing means being configured to sense acceleration of the sensing device as the sensing device moves relative to the region, the motion sensing means being configured to generate the movement data by periodically sampling the acceleration.

Preferably, the acceleration sensing means is configured to sense at least two substantially orthogonal components of acceleration.

Preferably, the coded data includes a plurality of tags, each tag being indicative of an identity of a region within which the tag lies.

In accordance with a second aspect of the present invention, there is provided a system for capturing information applied freehand, said system including a sensing device as described above, and a surface having coded data associated with the surface.

Features and advantages of the present invention will become apparent from the following description of embodiments thereof, by way of example only, with reference to the accompanying drawings.

BRIEF DESCRIPTION OF DRAWINGS

Preferred and other embodiments of the invention will now be described, by way of non-limiting example only, with reference to the accompanying drawings, in which:

FIG. 5c is a plan view showing an arrangement of nine of the tags shown in FIG. 5a where targets are shared between adjacent tags;

FIG. 5d is a plan view showing the interleaving and rotation of the symbols of the four codewords of the tag shown in FIG. 5a;

DETAILED DESCRIPTION OF PREFERRED AND OTHER EMBODIMENTS

Note: Memjet™ is a trademark of Silverbrook Research Pty Ltd, Australia.

In the preferred embodiment, the invention is configured to work with the netpage networked computer system, a summary of which is given below and a detailed description of which is given in our co-pending applications, including in particular applications U.S. Ser. No. 09/721,893, U.S. Ser. No. 09/722,142, U.S. Ser. No. 09/575,129 and granted patent U.S. Pat. No. 6,428,133. It will be appreciated that not every implementation will necessarily embody all or even most of the specific details and extensions described in these applications in relation to the basic system. However, the system is described in its most complete form to assist in understanding the context in which the preferred embodiments aspects of the present invention operate.

In brief summary, the preferred form of the netpage system employs a computer interface in the form of a mapped surface, that is, a physical surface which contains references to a map of the surface maintained in a computer system. The map references can be queried by an appropriate sensing device. Depending upon the specific implementation, the map references may be encoded visibly or invisibly, and defined in such a way that a local query on the mapped surface yields an unambiguous map reference both within the map and among different maps. The computer system can contain information about features on the mapped surface, and such information can be retrieved based on map references supplied by a sensing device used with the mapped surface. The information thus retrieved can take the form of actions which are initiated by the computer system on behalf of the operator in response to the operator's interaction with the surface features.

In its preferred form, the netpage system relies on the production of, and human interaction with, netpages. These are pages of text, graphics and images printed on ordinary paper or other media, but which work like interactive web pages. Information is encoded on each page using ink which is substantially invisible to the unaided human eye. The ink, however, and thereby the coded data, can be sensed by an optically imaging pen and transmitted to the netpage system.

In the preferred form, active buttons and hyperlinks on each page can be clicked with the pen to request information from the network or to signal preferences to a network server. In one embodiment, text written by hand on a netpage is automatically recognized and converted to computer text in the netpage system, allowing forms to be filled in. In other embodiments, signatures recorded on a netpage are automatically verified, allowing e-commerce transactions to be securely authorized.

Figure 1:
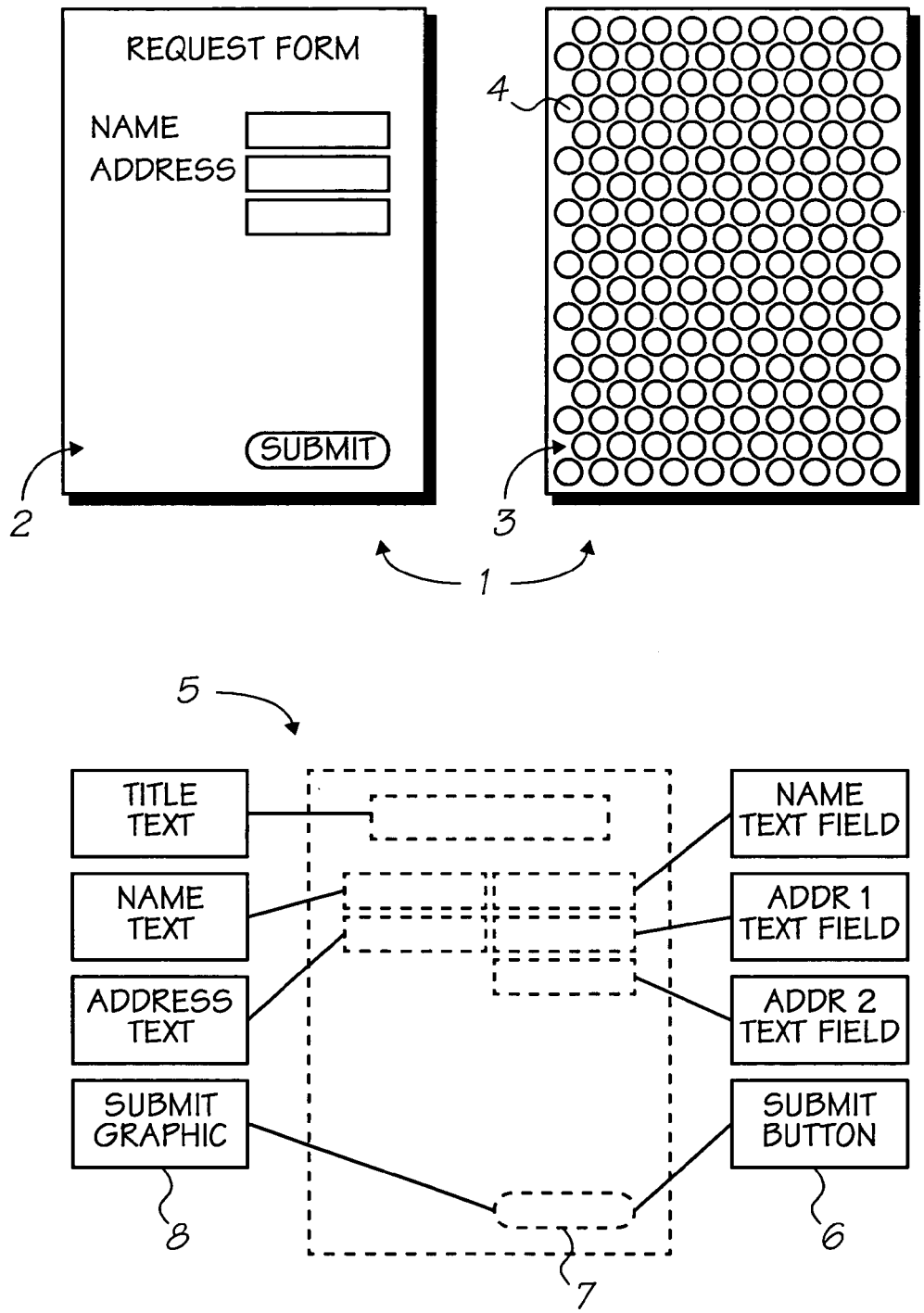
FIG. 1 is a schematic of a the relationship between a sample printed netpage and its online page description.

As illustrated in FIG. 1, a printed netpage 1 can represent a interactive form which can be filled in by the user both physically, on the printed page, and "electronically", via communication between the pen and the netpage system. The example shows a "Request" form containing name and address fields and a submit button. The netpage consists of graphic data 2 printed using visible ink, and coded data 3 printed as a collection of tags 4 using invisible ink. The corresponding page description 5, stored on the netpage network, describes the individual elements of the netpage. In particular it describes the type and spatial extent (zone) of each interactive element (i.e. text field or button in the example), to allow the netpage system to correctly interpret input via the netpage. The submit button 6, for example, has a zone 7 which corresponds to the spatial extent of the corresponding graphic 8.

Figure 2:
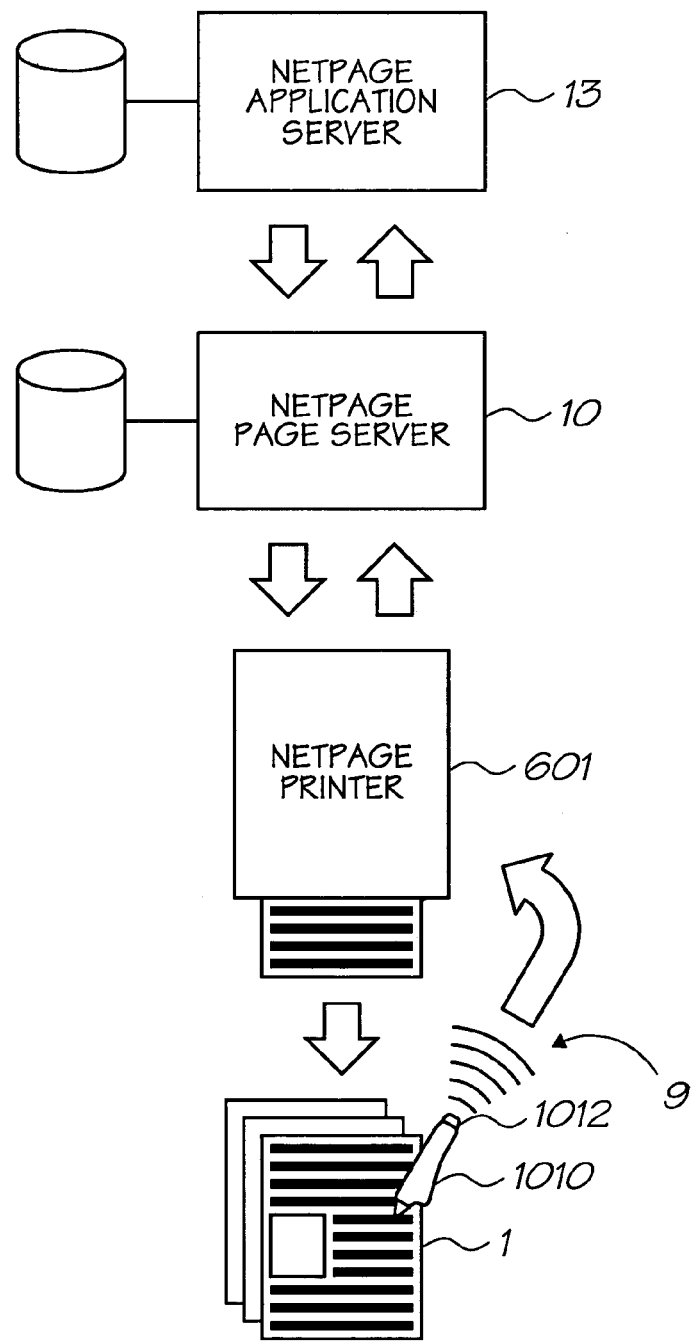
FIG. 2 is a schematic view of a interaction between a pen with an attached netpage code sensor attachment, a netpage printer, a netpage page server, and a netpage application server.

As illustrated in FIG. 2, the netpage pen 101, a preferred form of which is described in our co-pending application U.S. Ser. No. 09/575,174, works in conjunction with a netpage printer 601, an Internet-connected printing appliance for home, office or mobile use. The pen is wireless and communicates securely with the netpage printer via a short-range radio link 9.

The netpage printer 601, preferred forms of which are described in our co-pending applications U.S. Ser. No. 09/722,142 and U.S. Ser. No. 09/693,514, is able to deliver, periodically or on demand, personalized newspapers, magazines, catalogs, brochures and other publications, all printed at high quality as interactive netpages. Unlike a personal computer, the netpage printer is an appliance which can be, for example, wall-mounted adjacent to an area where the morning news is first consumed, such as in a user's kitchen, near a breakfast table, or near the household's point of departure for the day. It also comes in tabletop, desktop, portable and miniature versions.

Netpages printed at their point of consumption combine the ease-of-use of paper with the timeliness and interactivity of an interactive medium.

As shown in FIG. 2, the netpage pen 101 interacts with the coded data on a printed netpage 1 and communicates, via a short-range radio link 9, the interaction to a netpage printer. The printer 601 sends the interaction to the relevant netpage page server 10 for interpretation. In appropriate circumstances, the page server sends a corresponding message to application computer software running on a netpage application server 13. The application server may in turn send a response which is printed on the originating printer.

The netpage system is made considerably more convenient in the preferred embodiment by being used in conjunction with high-speed microelectromechanical system (MEMS) based inkjet (Memjet™) printers, for example as described in our co-pending granted patent U.S. Pat. No. 6,428,133. In the preferred form of this technology, relatively high-speed and high-quality printing is made more affordable to consumers. In its preferred form, a netpage publication has the physical characteristics of a traditional newsmagazine, such as a set of letter-size glossy pages printed in full color on both sides, bound together for easy navigation and comfortable handling.

The netpage printer exploits the growing availability of broadband Internet access. The netpage printer can also operate with slower connections, but with longer delivery times and lower image quality. The netpage system can also be enabled using existing consumer inkjet and laser printers, although the system will operate more slowly and will therefore be less acceptable from a consumer's point of view. In other embodiments, the netpage system is hosted on a private intranet. In still other embodiments, the netpage system is hosted on a single computer or computer-enabled device, such as a printer.

Netpage publication servers 14 on the netpage network are configured to deliver print-quality publications to netpage printers. Periodical publications are delivered automatically to subscribing netpage printers via pointcasting and multicasting Internet protocols. Personalized publications are filtered and formatted according to individual user profiles.

A netpage printer can be configured to support any number of pens, and a pen can work with any number of netpage printers. In the preferred implementation, each netpage pen has a unique identifier. A household may have a collection of colored netpage pens, one assigned to each member of the family. This allows each user to maintain a distinct profile with respect to a netpage publication server or application server.

A netpage pen can also be registered with a netpage registration server 11 and linked to one or more payment card accounts. This allows e-commerce payments to be securely authorized using the netpage pen. The netpage registration server compares the signature captured by the netpage pen with a previously registered signature, allowing it to authenticate the user's identity to an e-commerce server. Other biometrics can also be used to verify identity. A version of the netpage pen includes fingerprint scanning, verified in a similar way by the netpage registration server.

Although a netpage printer may deliver periodicals such as the morning newspaper without user intervention, it can be configured never to deliver unsolicited junk mail. In its preferred form, it only delivers periodicals from subscribed or otherwise authorized sources. In this respect, the netpage printer is unlike a fax machine or e-mail account which is visible to any junk mailer who knows the telephone number or e-mail address.

Each object model in the system is described using a Unified Modeling Language (UML) class diagram. A class diagram consists of a set of object classes connected by relationships, and two kinds of relationships are of interest here: associations and generalizations. An association represents some kind of relationship between objects, i.e. between instances of classes. A generalization relates actual classes, and can be understood in the following way: if a class is thought of as the set of all objects of that class, and class A is a generalization of class B, then B is simply a subset of A. Each class is drawn as a rectangle labelled with the name of the class. It contains a list of the attributes of the class, separated from the name by a horizontal line, and a list of the operations of the class, separated from the attribute list by a horizontal line. In the class diagrams which follow, however, operations are never modelled. An association is drawn as a line joining two classes, optionally labelled at either end with the multiplicity of the association. The default multiplicity is one. An asterisk (*) indicates a multiplicity of "many", i.e. zero or more. Each association is optionally labelled with its name, and is also optionally labelled at either end with the role of the corresponding class. An open diamond indicates an aggregation association ("is-part-of"), and is drawn at the aggregator end of the association line. A generalization relationship ("is-a") is drawn as a solid line joining two classes, with an arrow (in the form of an open triangle) at the generalization end. When a class diagram is broken up into multiple diagrams, any class which is duplicated is shown with a dashed outline in all but the main diagram which defines it. It is shown with attributes only where it is defined.

Netpages are the foundation on which a netpage network is built. They provide a paper-based user interface to published information and interactive services. A netpage consists of a printed page (or other surface region) invisibly tagged with references to an online description of the page. The online page description is maintained persistently by a netpage page server. The page description describes the visible layout and content of the page, including text, graphics and images. It also describes the input elements on the page, including buttons, hyperlinks, and input fields. A netpage allows markings made with a netpage pen on its surface to be simultaneously captured and processed by the netpage system.

Multiple netpages can share the same page description. However, to allow input through otherwise identical pages to be distinguished, each netpage is assigned a unique page identifier. This page ID has sufficient precision to distinguish between a very large number of netpages.

Each reference to the page description is encoded in a printed tag. The tag identifies the unique page on which it appears, and thereby indirectly identifies the page description. The tag also identifies its own position on the page. Characteristics of the tags are described in more detail below.

Tags are printed in infrared-absorptive ink on any substrate which is infrared-reflective, such as ordinary paper. Near-infrared wavelengths are invisible to the human eye but are easily sensed by a solid-state image sensor with an appropriate filter.

A tag is sensed by an area image sensor in the netpage pen, and the tag data is transmitted to the netpage system via the nearest netpage printer. The pen is wireless and communicates with the netpage printer via a short-range radio link. Tags are sufficiently small and densely arranged that the pen can reliably image at least one tag even on a single click on the page. It is important that the pen recognize the page ID and position on every interaction with the page, since the interaction is stateless. Tags are error-correctably encoded to make them partially tolerant to surface damage.

The netpage page server maintains a unique page instance for each printed netpage, allowing it to maintain a distinct set of user-supplied values for input fields in the page description for each printed netpage.

Figure 3:
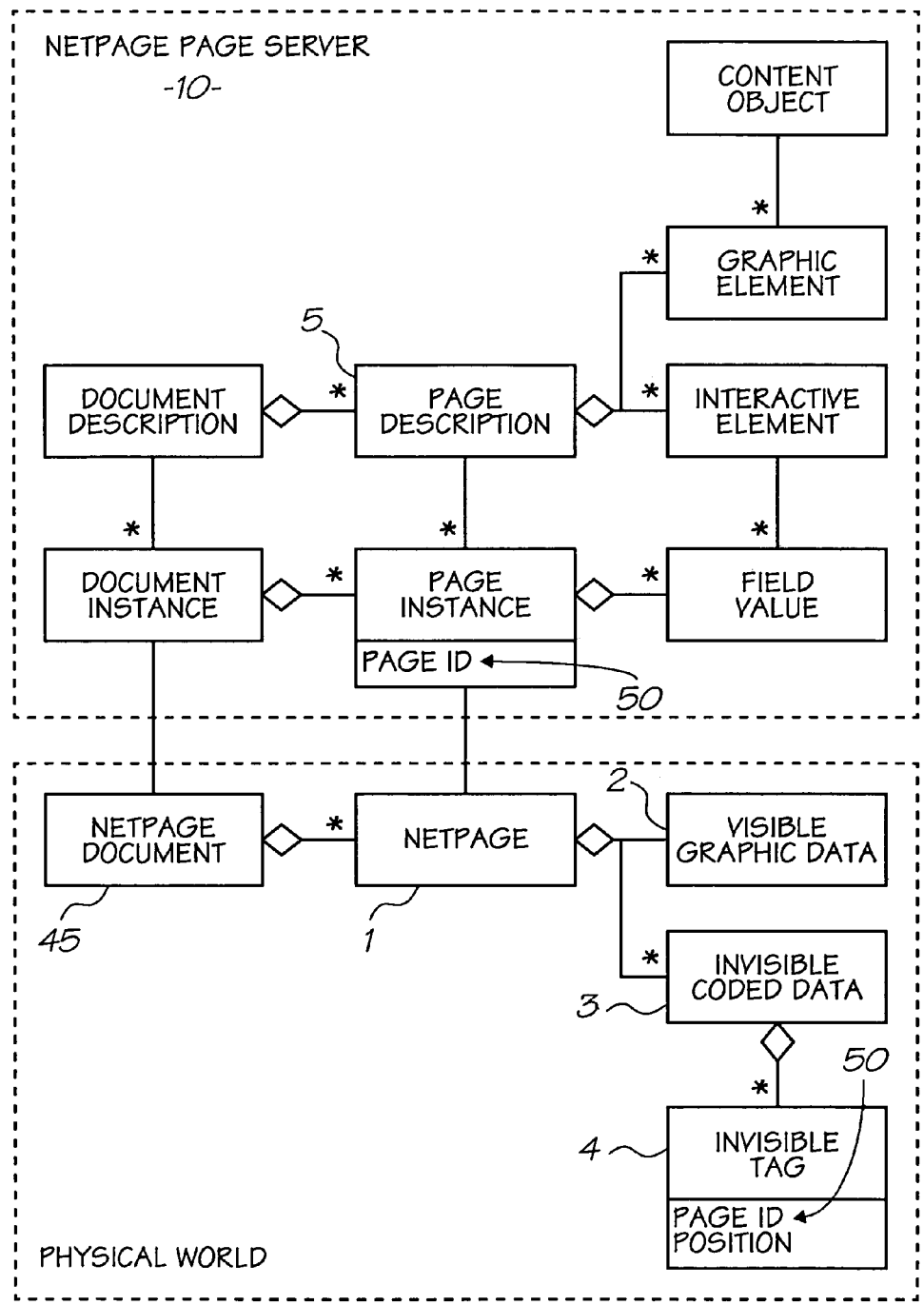
FIG. 3 is a schematic view of a high-level structure of a printed netpage and its online page description.

The relationship between the page description, the page instance, and the printed netpage is shown in FIG. 3. The printed netpage may be part of a printed netpage document 45. The page instance is associated with both the netpage printer which printed it and, if known, the netpage user who requested it.

In a preferred form, each tag identifies the region in which it appears, and the location of that tag within the region. A tag may also contain flags which relate to the region as a whole or to the tag. One or more flag bits may, for example, signal a tag sensing device to provide feedback indicative of a function associated with the immediate area of the tag, without the sensing device having to refer to a description of the region. A netpage pen may, for example, illuminate an "active area" LED when in the zone of a hyperlink.

In a preferred embodiment, each tag contains an easily recognized invariant structure which aids initial detection, and which assists in minimizing the effect of any warp induced by the surface or by the sensing process. The tags preferably tile the entire page, and are sufficiently small and densely arranged that the pen can reliably image at least one tag even on a single click on the page. It is important that the pen recognize the page ID and position on every interaction with the page, since the interaction is stateless.

In a preferred embodiment, the region to which a tag refers coincides with an entire page, and the region ID encoded in the tag is therefore synonymous with the page ID of the page on which the tag appears. In other embodiments, the region to which a tag refers can be an arbitrary subregion of a page or other surface. For example, it can coincide with the zone of an interactive element, in which case the region ID can directly identify the interactive element.

Each tag contains typically contains 16 bits of tag ID, at least 90 bits of region ID, and a number of flag bits. Assuming a maximum tag density of 64 per square inch, a 16-bit tag ID supports a region size of up to 1024 square inches. Larger regions can be mapped continuously without increasing the tag ID precision simply by using abutting regions and maps. The distinction between a region ID and a tag ID is mostly one of convenience. For most purposes the concatenation of the two can be considered as a globally unique tag ID. Conversely, it may also be convenient to introduce structure into the tag ID, for example to define the x and y coordinates of the tag. A 90-bit region ID allows $2^{90}$ (~$10^{27}$ or a thousand trillion trillion) different regions to be uniquely identified. Tags may also contain type information, and a region may be tagged with a mixture of tag types. For example, a region may be tagged with one set of tags encoding x coordinates and another set, interleaved with the first, encoding y coordinates.

In one embodiment, 120 bits of tag data are redundantly encoded using a (15, 5) Reed-Solomon code. This yields 360 encoded bits consisting of 6 codewords of 15 4-bit symbols each. The (15, 5) code allows up to 5 symbol errors to be corrected per codeword, i.e. it is tolerant of a symbol error rate of up to 33% per codeword. Each 4-bit symbol is represented in a spatially coherent way in the tag, and the symbols of the six codewords are interleaved spatially within the tag. This ensures that a burst error (an error affecting multiple spatially adjacent bits) damages a minimum number of symbols overall and a minimum number of symbols in any one codeword, thus maximising the likelihood that the burst error can be fully corrected.

Any suitable error-correcting code code can be used in place of a (15, 5) Reed-Solomon code, for example a Reed-Solomon code with more or less redundancy, with the same or different symbol and codeword sizes; another block code; or a different kind of code, such as a convolutional code (see, for example, Stephen B. Wicker, Error Control Systems for Digital Communication and Storage, Prentice-Hall 1995, the contents of which a herein incorporated by cross-reference).

Figure 4A:
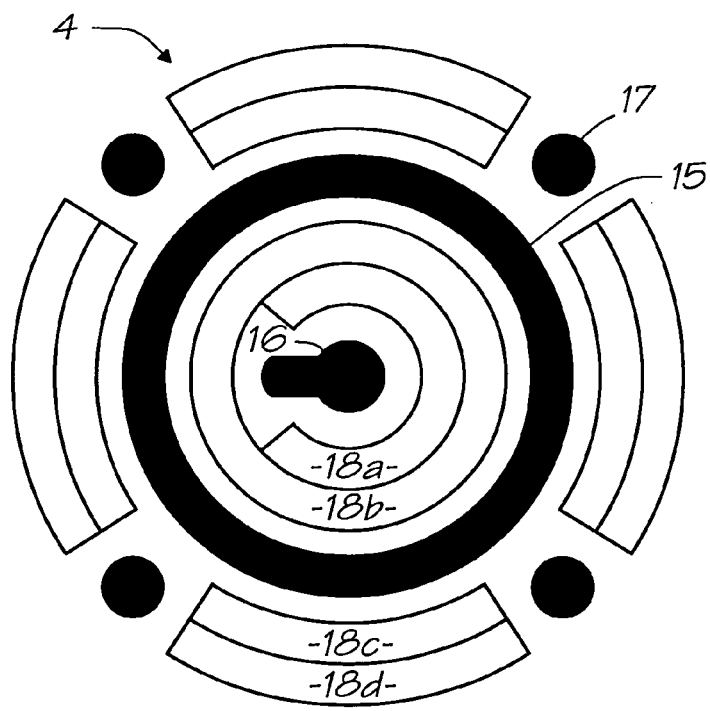
FIG. 4a is a plan view showing a structure of a netpage tag.

One embodiment of the physical representation of the tag, shown in FIG. 4a and described in our co-pending application U.S. Ser. No. 09/575,129, includes fixed target structures 15, 16, 17 and variable data areas 18. The fixed target structures allow a sensing device such as the netpage pen to detect the tag and infer its three-dimensional orientation relative to the sensor. The data areas contain representations of the individual bits of the encoded tag data. To maximise its size, each data bit is represented by a radial wedge in the form of an area bounded by two radial lines and two concentric circular arcs. Each wedge has a minimum dimension of 8 dots at 1600 dpi and is designed so that its base (its inner arc), is at least equal to this minimum dimension. The height of the wedge in the radial direction is always equal to the minimum dimension. Each 4-bit data symbol is represented by an array of 2×2 wedges. The fifteen 4-bit data symbols of each of the six codewords are allocated to the four concentric symbol rings 18*a* to 18*d* in interleaved fashion. Symbols are allocated alternately in circular progression around the tag. The interleaving is designed to maximise the average spatial distance between any two symbols of the same codeword.

Figure 4B:
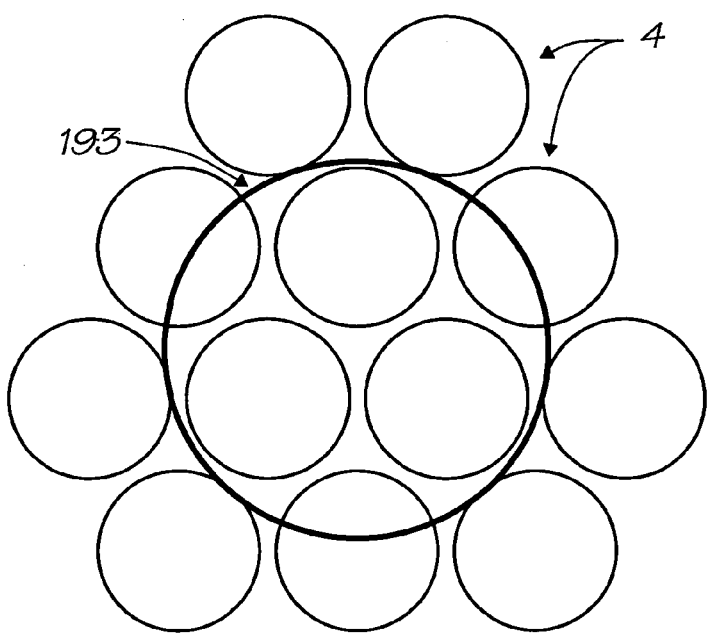
FIG. 4b is a plan view showing a relationship between a set of the tags shown in FIG. 4a and a field of view of a netpage sensing device.

In order to support "single-click" interaction with a tagged region via a sensing device, the sensing device must be able to see at least one entire tag in its field of view no matter where in the region or at what orientation it is positioned. The required diameter of the field of view of the sensing device is therefore a function of the size and spacing of the tags. Assuming a circular tag shape, the minimum diameter of the sensor field of view 193 is obtained when the tags are tiled on a equilateral triangular grid, as shown in FIG. 4*b*.

Figure 6:
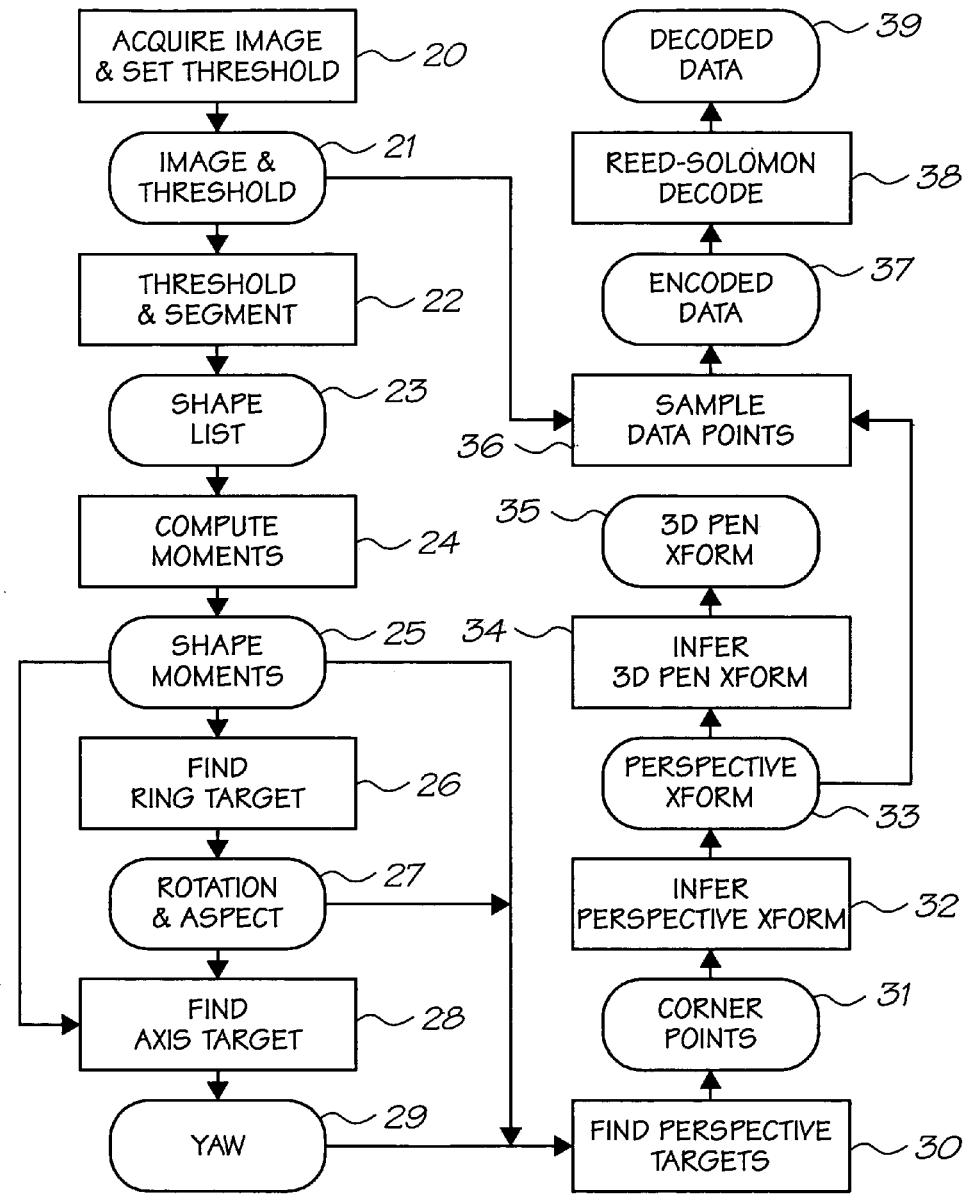
FIG. 6 is a schematic view of a tag image processing and decoding algorithm.
Figure 7:
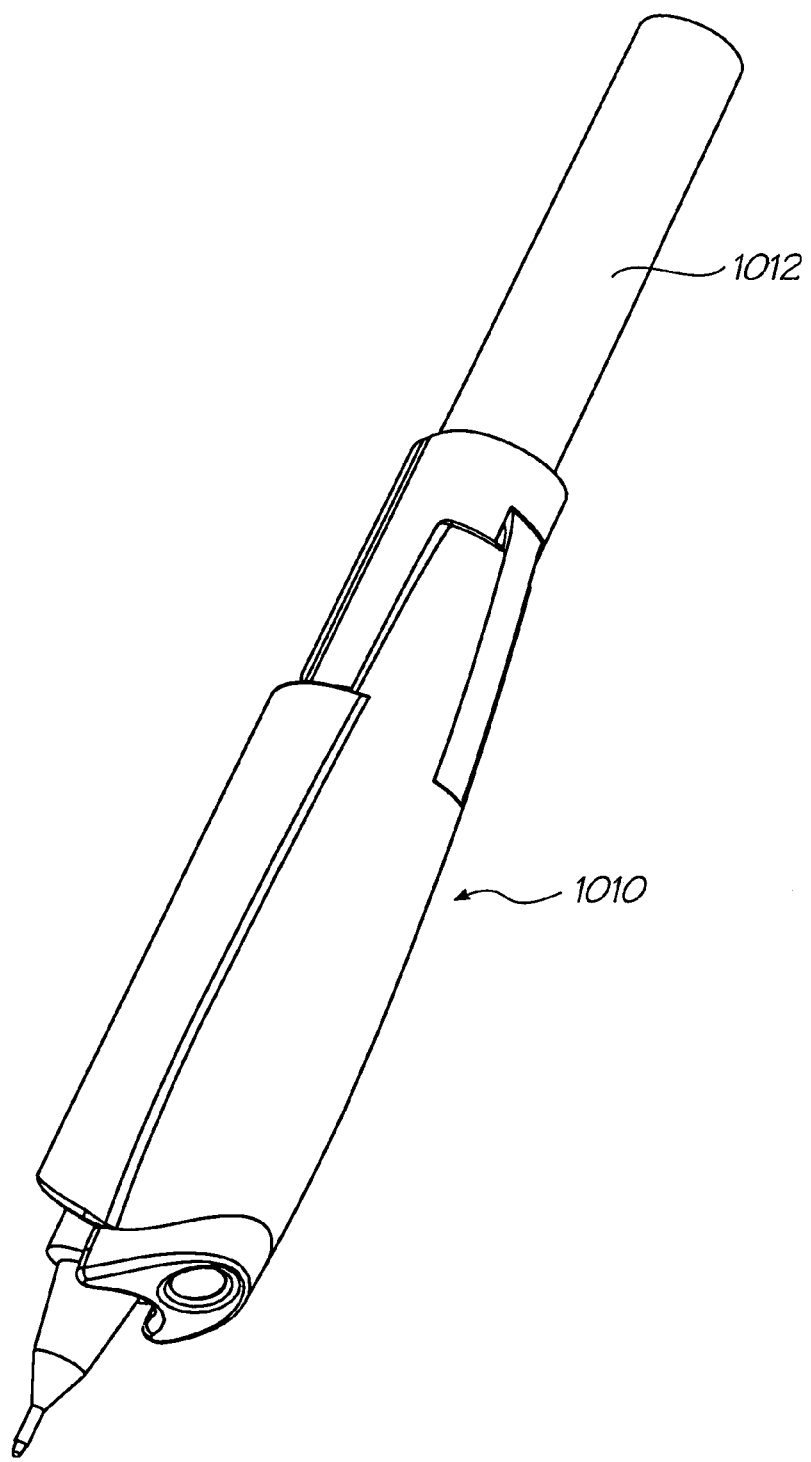
FIG. 7 is a perspective view of a netpage code sensor attachment according to the present invention, attached to a pen.
Figure 8:
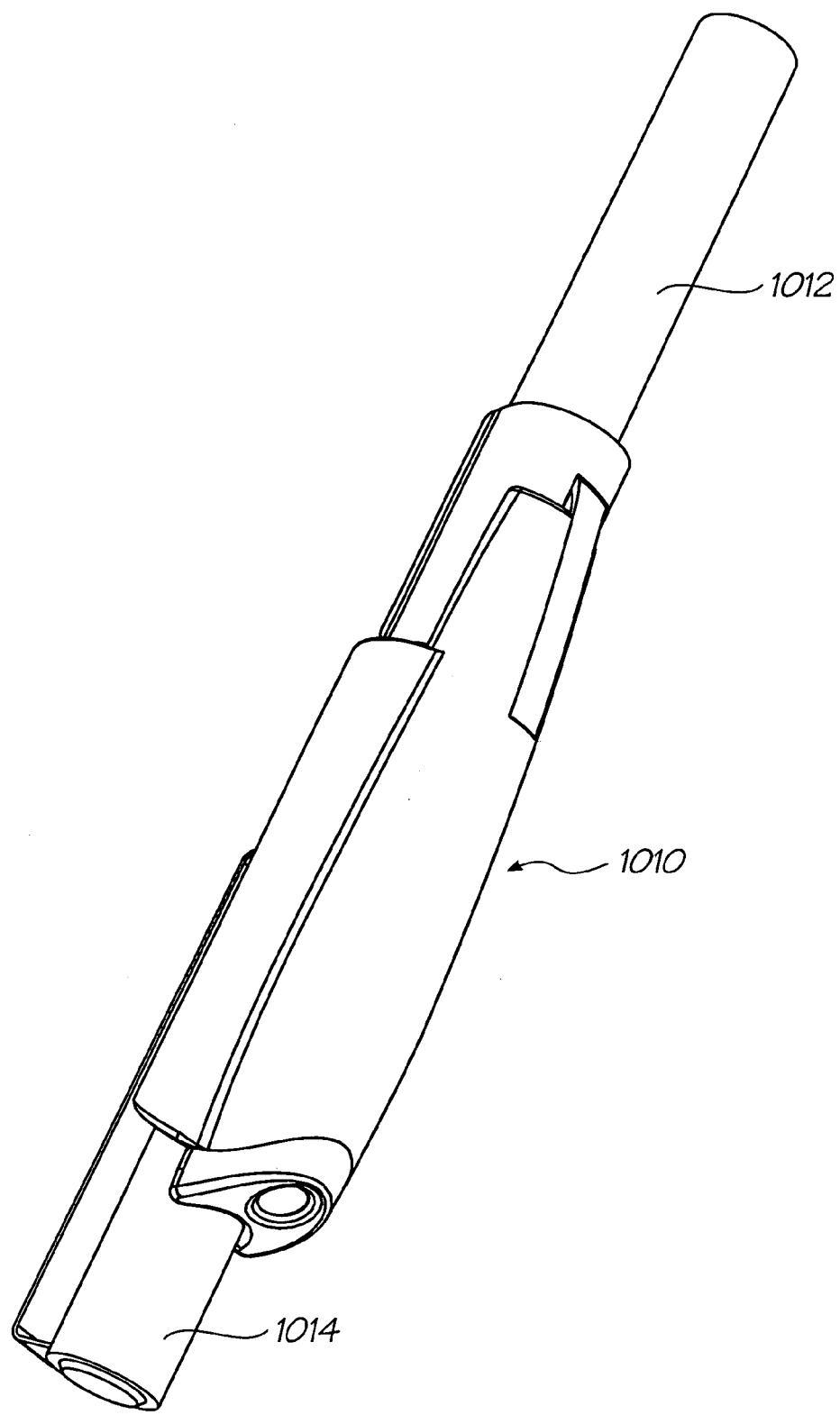
FIG. 8 is a perspective view of the netpage code sensor attachment attached to a capped pen.
Figure 9:
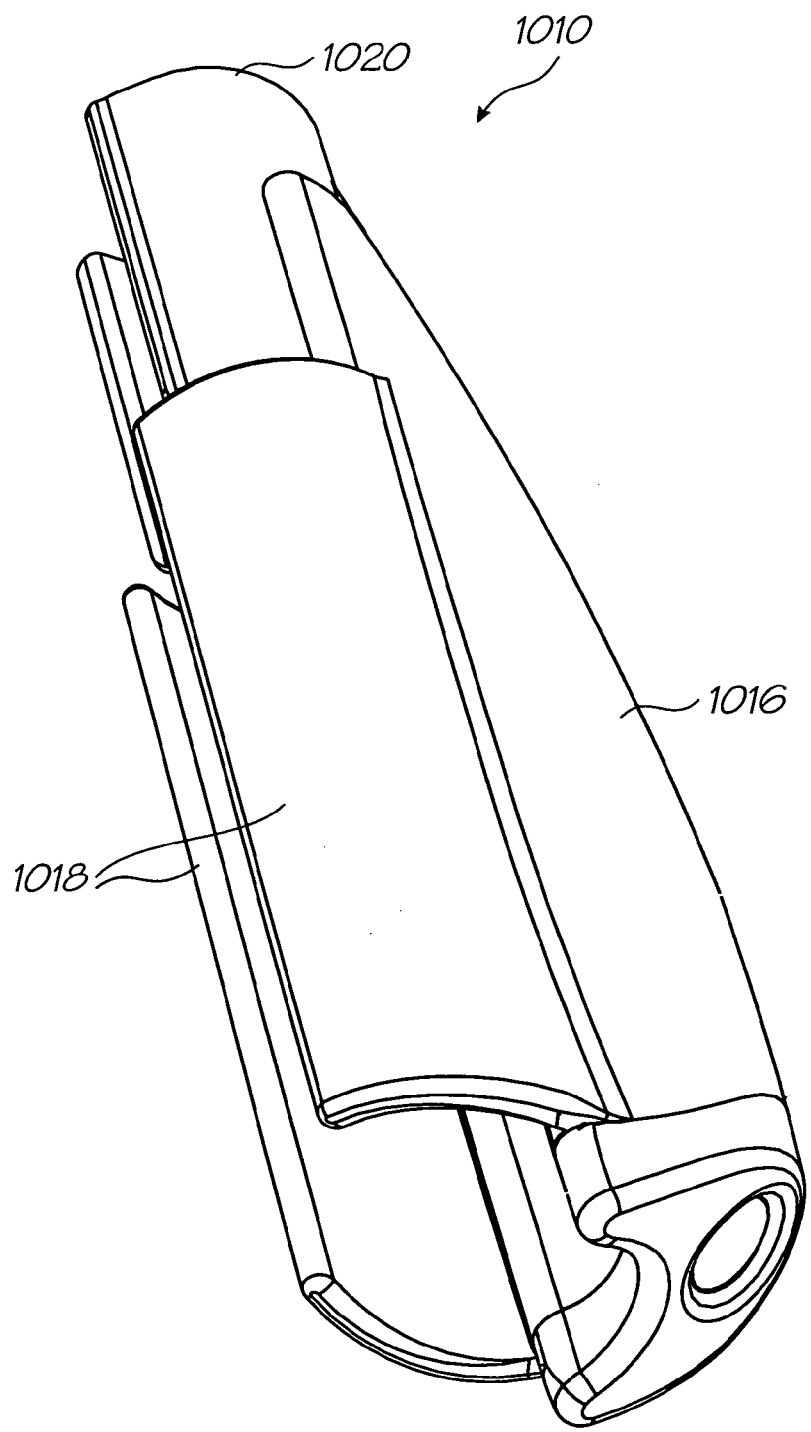
FIG. 9 is a perspective view of the netpage code sensor attachment.
Figure 10:
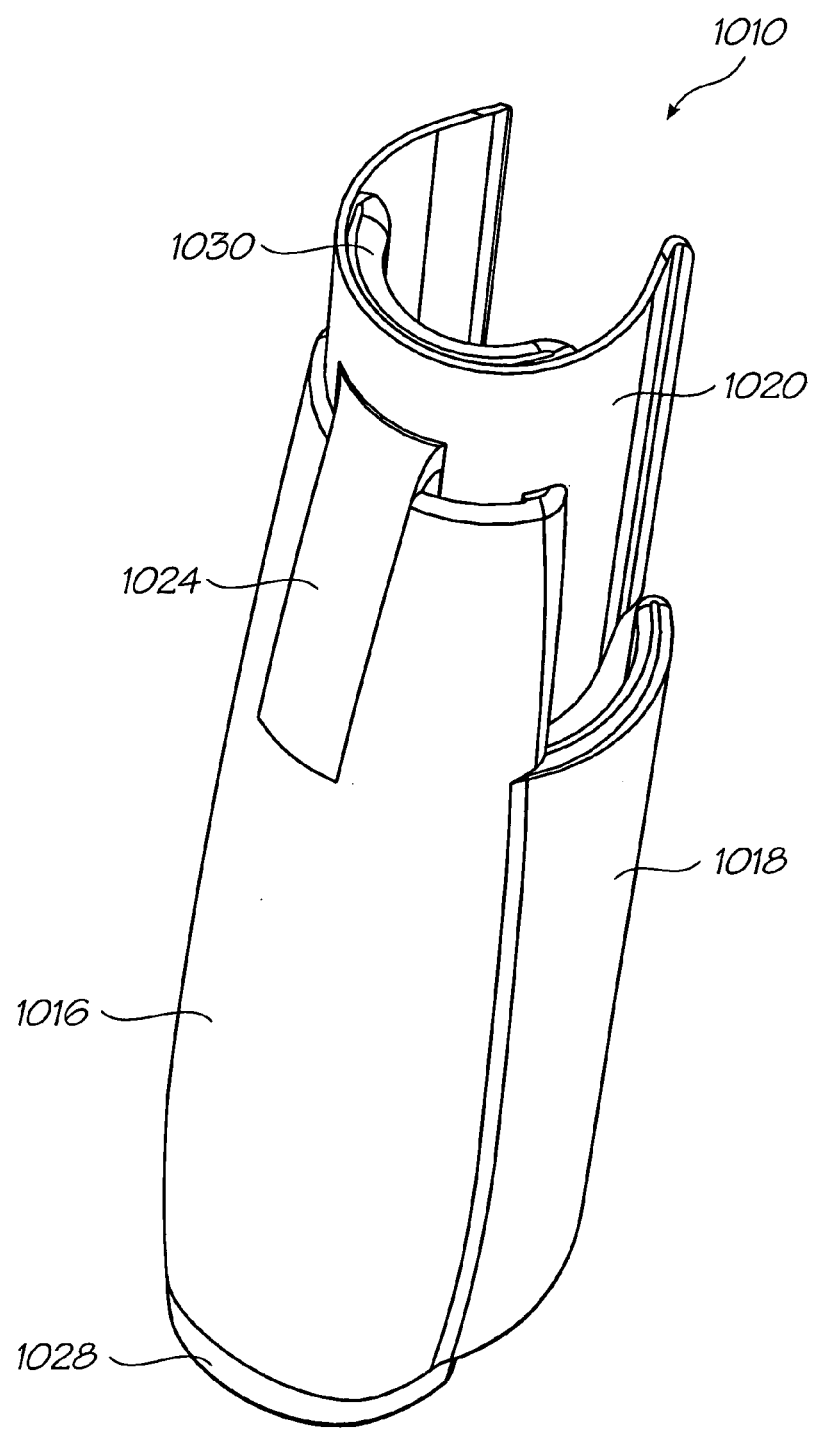
FIG. 10 is a perspective view of the underside of the netpage code sensor attachment.
Figure 11:
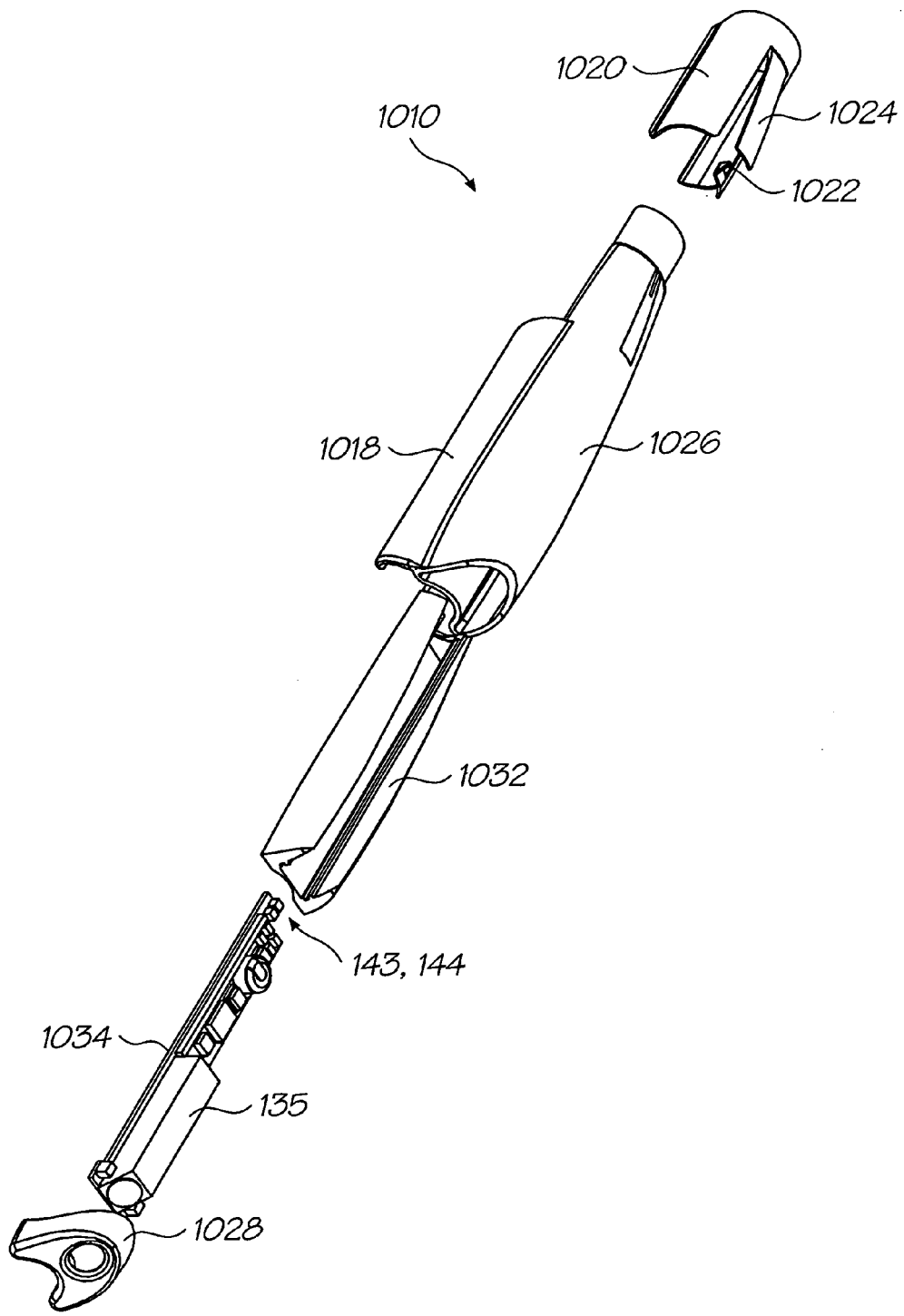
FIG. 11 is an exploded view of the netpage code sensor attachment.
Figure 12:
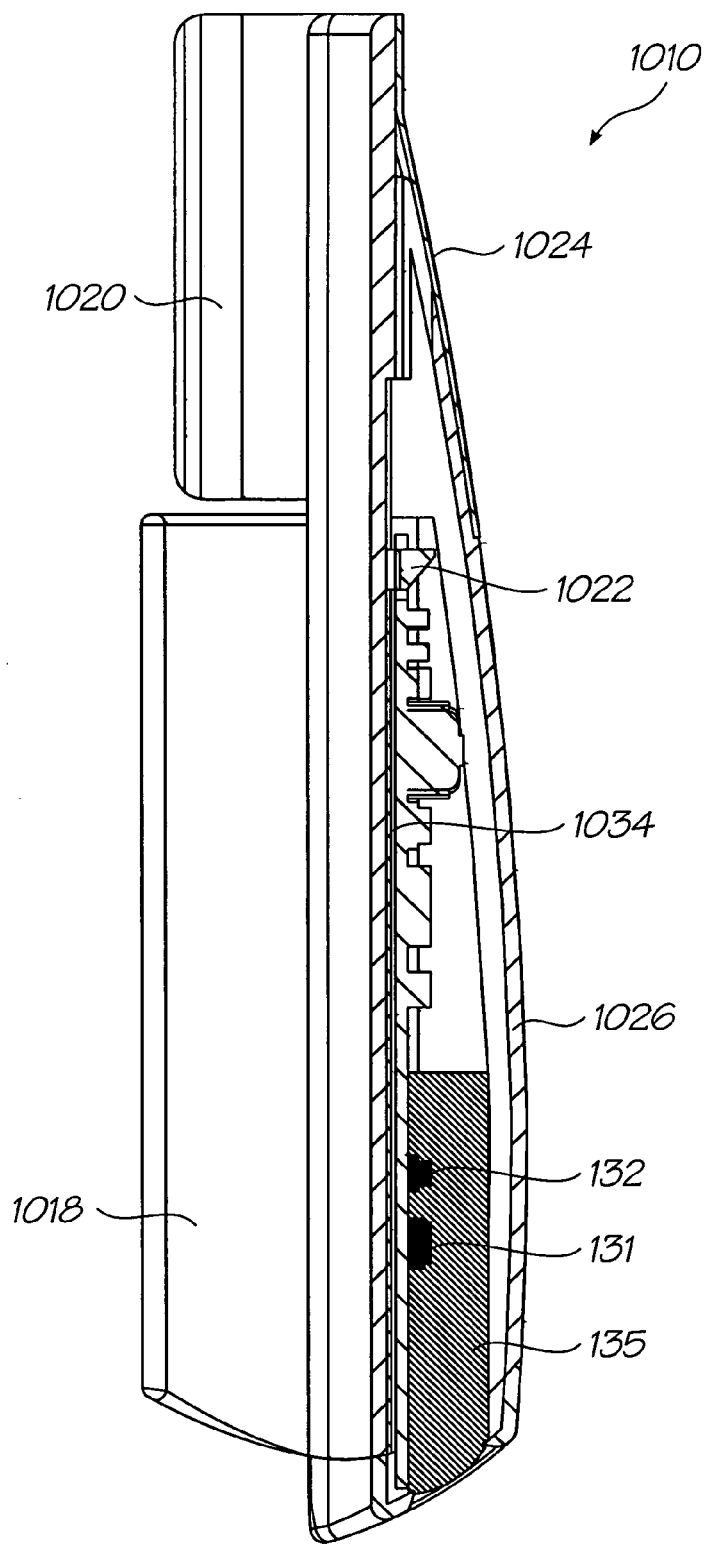
FIG. 12 is a cross section of the netpage code sensor attachment.
Figure 13:
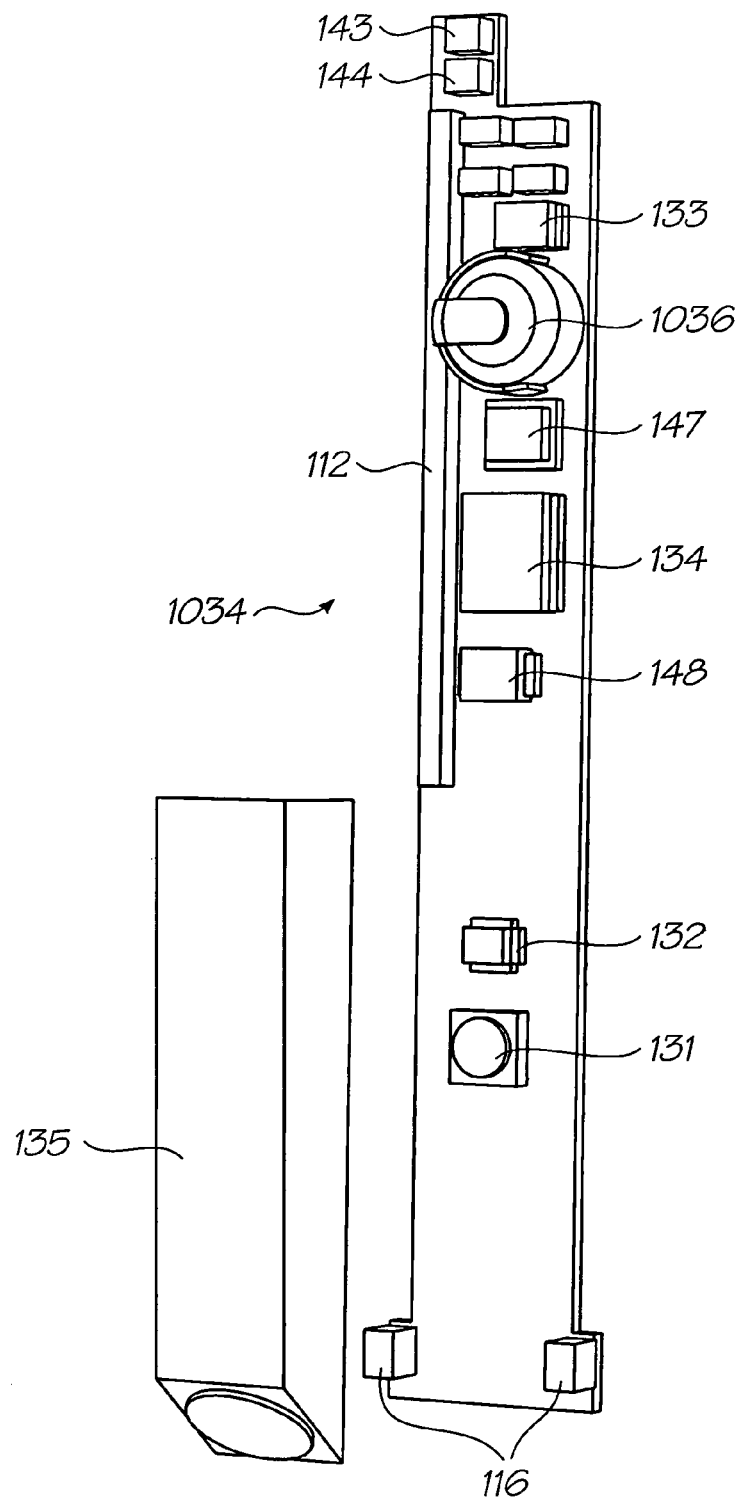
FIG. 13 is a perspective view of the PCB and optics block of the netpage code sensor attachment.

The tag image processing and decoding performed by a sensing device such as the netpage pen is shown in FIG. 6. While a captured image is being acquired from the image sensor, the dynamic range of the image is determined (at 20). The center of the range is then chosen as the binary threshold for the image 21. The image is then thresholded and segmented into connected pixel regions (i.e. shapes 23) (at 22). Shapes which are too small to represent tag target structures are discarded. The size and centroid of each shape is also computed.

Binary shape moments 25 are then computed (at 24) for each shape, and these provide the basis for subsequently locating target structures. Central shape moments are by their nature invariant of position, and can be easily made invariant of scale, aspect ratio and rotation.

The ring target structure 15 is the first to be located (at 26). A ring has the advantage of being very well behaved when perspective-distorted. Matching proceeds by aspect-normalizing and rotation-normalizing each shape's moments. Once its second-order moments are normalized the ring is easy to recognize even if the perspective distortion was significant. The ring's original aspect and rotation 27 together provide a useful approximation of the perspective transform.

The axis target structure 16 is the next to be located (at 28). Matching proceeds by applying the ring's normalizations to each shape's moments, and rotation-normalizing the resulting moments. Once its second-order moments are normalized the axis target is easily recognized. Note that one third order moment is required to disambiguate the two possible orientations of the axis. The shape is deliberately skewed to one side to make this possible. Note also that it is only possible to rotation-normalize the axis target after it has had the ring's normalizations applied, since the perspective distortion can hide the axis target's axis. The axis target's original rotation provides a useful approximation of the tag's rotation due to pen yaw 29.

The four perspective target structures 17 are the last to be located (at 30). Good estimates of their positions are computed based on their known spatial relationships to the ring and axis targets, the aspect and rotation of the ring, and the rotation of the axis. Matching proceeds by applying the ring's normalizations to each shape's moments. Once their second-order moments are normalized the circular perspective targets are easy to recognize, and the target closest to each estimated position is taken as a match. The original centroids of the four perspective targets are then taken to be the perspective-distorted corners 31 of a square of known size in tag space, and an eight-degree-of-freedom perspective transform 33 is inferred (at 32) based on solving the well-understood equations relating the four tag-space and image-space point pairs (see Heckbert, P., Fundamentals of Texture Mapping and Image Warping, Masters Thesis, Dept. of EECS, U. of California at Berkeley, Technical Report No. UCB/CSD 89/516, June 1989, the contents of which are herein incorporated by cross-reference).

The inferred tag-space to image-space perspective transform is used to project (at 36) each known data bit position in tag space into image space where the real-valued position is used to bilinearly interpolate (at 36) the four relevant adjacent pixels in the input image. The previously computed image threshold 21 is used to threshold the result to produce the final bit value 37.

Once all 360 data bits 37 have been obtained in this way, each of the six 60-bit Reed-Solomon codewords is decoded (at 38) to yield 20 decoded bits 39, or 120 decoded bits in total. Note that the codeword symbols are sampled in codeword order, so that codewords are implicitly de-interleaved during the sampling process.

The ring target 15 is only sought in a subarea of the image whose relationship to the image guarantees that the ring, if found, is part of a complete tag. If a complete tag is not found and successfully decoded, then no pen position is recorded for the current frame. Given adequate processing power and ideally a non-minimal field of view 193, an alternative strategy involves seeking another tag in the current image.

The obtained tag data indicates the identity of the region containing the tag and the position of the tag within the region. An accurate position 35 of the pen nib in the region, as well as the overall orientation 35 of the pen, is then inferred (at 34) from the perspective transform 33 observed on the tag and the known spatial relationship between the pen's physical axis and the pen's optical axis.

The tag structure just described is designed to allow both regular tilings of planar surfaces and irregular tilings of non-planar surfaces. Regular tilings are not, in general, possible on non-planar surfaces. In the more usual case of planar surfaces where regular tilings of tags are possible, i.e. surfaces such as sheets of paper and the like, more efficient tag structures can be used which exploit the regular nature of the tiling.

Figure 5A:
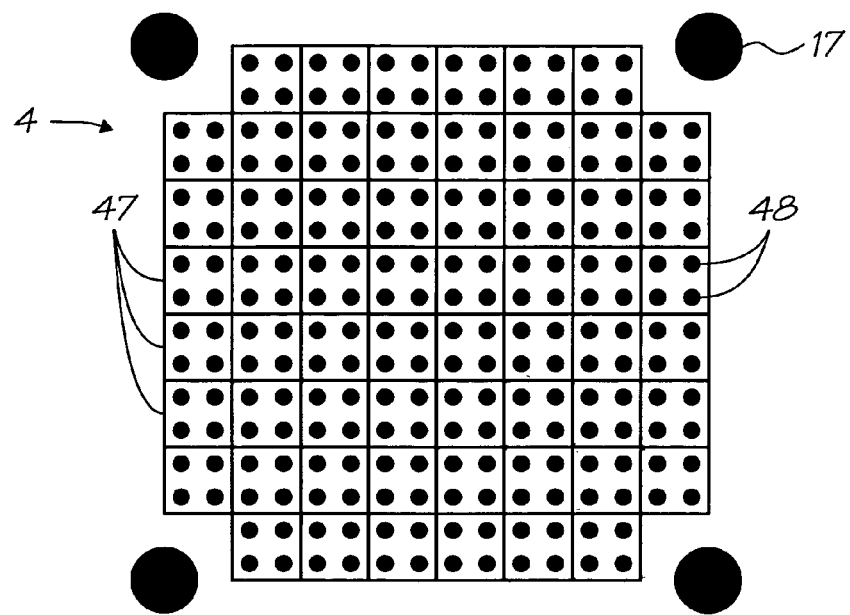
FIG. 5a is a plan view showing an alternative structure of a netpage tag.
Figure 5B:
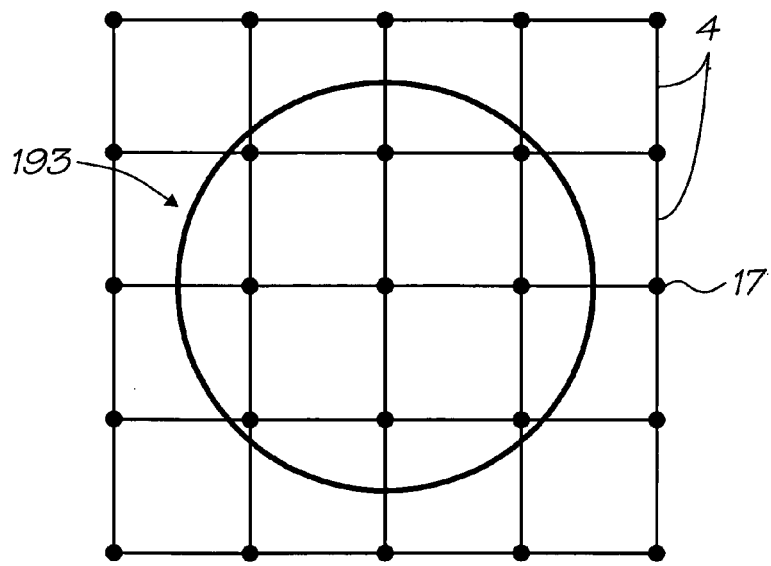
FIG. 5b is a plan view showing a relationship between a set of the tags shown in FIG. 5a and a field of view of a netpage sensing device.
Figures 5C, 5D:
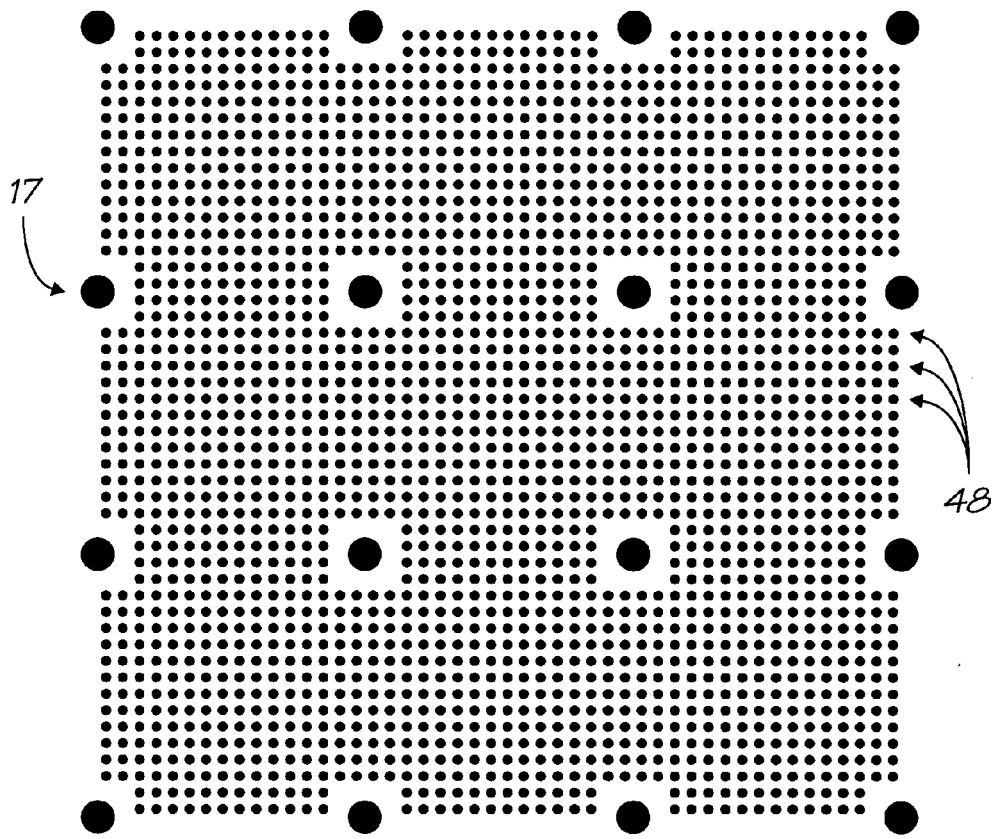

An alternative tag structure more suited to a regular tiling is shown in FIG. 5*a*. The tag 4 is square and has four perspective targets 17. It is similar in structure to tags described by Bennett et al. in U.S. Pat. No. 5,051,746. The tag represents sixty 4-bit Reed-Solomon symbols 47, for a total of 240 bits. The tag represents each one bit as a dot 48, and each zero bit by the absence of the corresponding dot. The perspective targets are designed to be shared between adjacent tags, as shown in FIGS. 5*b* and 5*c*. FIG. 5*b* shows a square tiling of 16 tags and the corresponding minimum field of view 193, which must span the diagonals of two tags. FIG. 5*c* shows a square tiling of nine tags, containing all one bits for illustration purposes.

Using a (15, 7) Reed-Solomon code, 112 bits of tag data are redundantly encoded to produce 240 encoded bits. The four codewords are interleaved spatially within the tag to maximize resilience to burst errors. Assuming a 16-bit tag ID as before, this allows a region ID of up to 92 bits. The data-bearing dots 48 of the tag are designed to not overlap their neighbors, so that groups of tags cannot produce structures which resemble targets. This also saves ink. The perspective targets therefore allow detection of the tag, so further targets are not required. Tag image processing proceeds as described above, with the exception that steps 26 and 28 are omitted.

Although the tag may contain an orientation feature to allow disambiguation of the four possible orientations of the tag relative to the sensor, it is also possible to embed orientation data in the tag data. For example, the four codewords can be arranged so that each tag orientation contains one codeword placed at that orientation, as shown in FIG. 5d, where each symbol is labelled with the number of its codeword (1–4) and the position of the symbol within the codeword (A–O). Tag decoding then consists of decoding one codeword at each orientation. Each codeword can either contain a single bit indicating whether it is the first codeword, or two bits indicating which codeword it is. The latter approach has the advantage that if, say, the data content of only one codeword is required, then at most two codewords need to be decoded to obtain the desired data. This may be the case if the region ID is not expected to change within a stroke and is thus only decoded at the start of a stroke. Within a stroke only the codeword containing the tag ID is then desired. Furthermore, since the rotation of the sensing device changes slowly and predictably within a stroke, only one codeword typically needs to be decoded per frame.

It is possible to dispense with perspective targets altogether and instead rely on the data representation being self-registering. In this case each bit value (or multi-bit value) is typically represented by an explicit glyph, i.e. no bit value is represented by the absence of a glyph. This ensures that the data grid is well-populated, and thus allows the grid to be reliably identified and its perspective distortion detected and subsequently corrected during data sampling. To allow tag boundaries to be detected, each tag data must contain a marker pattern, and these must be redundantly encoded to allow reliable detection. The overhead of such marker patterns is similar to the overhead of explicit perspective targets. One such scheme uses dots positioned a various points relative to grid vertices to represent different glyphs and hence different multi-bit values (see Anoto Technology Description, Anoto April 2000).

Decoding a tag results in a region ID, a tag ID, and a tag-relative pen transform. Before the tag ID and the tag-relative pen location can be translated into an absolute location within the tagged region, the location of the tag within the region must be known. This is given by a tag map, a function which maps each tag ID in a tagged region to a corresponding location. A tag map reflects the scheme used to tile the surface region with tags, and this can vary according to surface type. When multiple tagged regions share the same tiling scheme and the same tag numbering scheme, they can also share the same tag map. The tag map for a region must be retrievable via the region ID. Thus, given a region ID, a tag ID and a pen transform, the tag map can be retrieved, the tag ID can be translated into an absolute tag location within the region, and the tag-relative pen location can be added to the tag location to yield an absolute pen location within the region.

The tag ID may have a structure which assists translation through the tag map. It may, for example, encoded cartesian coordinates or polar coordinates, depending on the surface type on which it appears. The tag ID structure is dictated by and known to the tag map, and tag IDs associated with different tag maps may therefore have different structures.

Two distinct surface coding schemes are of interest, both of which use the tag structure described earlier in this section. The preferred coding scheme uses "location-indicating" tags as already discussed. An alternative coding scheme uses "object-indicating" (or "function-indicating") tags.

A location-indicating tag contains a tag ID which, when translated through the tag map associated with the tagged region, yields a unique tag location within the region. The tag-relative location of the pen is added to this tag location to yield the location of the pen within the region. This in turn is used to determine the location of the pen relative to a user interface element in the page description associated with the region. Not only is the user interface element itself identified, but a location relative to the user interface element is identified. Location-indicating tags therefore trivially support the capture of an absolute pen path in the zone of a particular user interface element.

An object-indicating (or function-indicating) tag contains a tag ID which directly identifies a user interface element in the page description associated with the region (or equivalently, a function). All the tags in the zone of the user interface element identify the user interface element, making them all identical and therefore indistinguishable. Object-indicating tags do not, therefore, support the capture of an absolute pen path. They do, however, support the capture of a relative pen path. So long as the position sampling frequency exceeds twice the encountered tag frequency, the displacement from one sampled pen position to the next within a stroke can be unambiguously determined. As an alternative, the netpage pen 101 can contain a pair or motion-sensing accelerometers, as described in our co-pending application U.S. Ser. No. 09/721,893.

An embodiment of the present invention, in the form of a sensing device for coded surfaces, attachable to a stylus or a marking device such as a pen, pencil or eraser, will now be described. The attachable sensing device is hereinafter referred to as a code sensor attachment or code sensor, as appropriate.

The code sensor attachment, when attached to an implement such as a stylus or pen, effectively transforms the implement into a netpage stylus or pen. The code sensor attachment senses the force exerted on the surface by the implement's nib, senses the movement of the implement relative to a netpage-encoded surface, and transmits the resulting digital ink to a netpage base station.

A first embodiment of the present invention will now be described with reference to FIGS. 7, 8, 9, 10, 11, 12 and 13. The code sensor attachment, generally designated by reference numeral 1010, includes a housing 1026, in the form of a plastic molding, which defines an interior space for mounting code sensor components. The housing 1026 also has projecting grip areas 1018 which allow a user to comfortably grip the code sensor. The housing 1026 receives a chassis molding 1032 which in turn receives, via opposed slots, a PCB 1034. A cover 1028 is secured to the end of the housing 1026. The cover 1028 is also of molded plastics, and is formed from semi-transparent material to allow the user to view status LEDs 116 mounted at the end of the PCB 1034. The cover 1028 also provides an aperture for the optics block 135 mounted on the PCB 1034.

A metal clip 1020 is secured to the housing 1026 at the opposite end to the cover 1028. The clip is held in place by a pre-stressed flexing metal arm 1024 which engages a slot on the underside of the housing 1026. The metal clip 1020 flexibly grips an implement such as a stylus or pen. A rubber pad 1030 is attached to the interior surface of the metal clip 1020, providing a highly frictional and somewhat compressive seat for the held implement. The metal clip 1020 accommodates a range of implement diameters.

Any number of alternative methods may be used to attach the code sensor to the implement. For example, an elastic weave strap with Velcro fastening; a pivoting or separate clamp plate securable via a nut and bolt assembly; a pair of pivoting and sprung clamp plates; or a jubilee clip arrangement securable via a tightening screw.

When the code sensor attachment is attached to an implement, the user grips the code sensor by the grip areas 1018, i.e. typically between thumb and forefinger. The projecting grip areas 1018 of the housing 1026 define an interior space large enough to accommodate the implement without contact. The implement, which is held by the metal clip 1020, is allowed to pivot slightly with respect to the housing 1026 when its nib is pressed against a surface, by virtue of the flexibility of the flexing metal arm 1024 of the metal clip 1020. A finger 1022 projecting from the metal clip thereby moves relative to the end of the PCB 1034, where an LED 143 illuminates it and a photodiode 144 captures the intensity of the light it reflects. While the interior of finger's surrounding cavity has low reflectivity, the finger is coated to make it highly diffusely reflective. The intensity of light reflected by the finger gives an indication of the displacement of the finger and thereby gives an indication of the force exerted on the nib. The finger 1022 has a triangular profile so that the reflected light intensity varies linearly with displacement.

An infrared LED 131, mounted on the PCB 1034, provides infrared illumination of netpage tags on the surface, while an image sensor 132, also mounted on the PCB, images the tags. A radio frequency (RF) chip 133, containing analog RF transceiver components, and a controller chip 134 for controlling operation of the code sensor, are also mounted on the PCB. An optics block 135, formed from molded clear plastics, is mounted on the PCB on top of the infrared illumination LED 131 and the image sensor 132. It projects illumination from the LED 131 onto the surface and projects images of the surface onto the image sensor 132. A replaceable 3V battery 1036 is seated on the PCB. A flash memory 147, containing controller software, identity and configuration information, and a DRAM 148 of typically 512 KB capacity, are also mounted on the PCB.

The code sensor attachment 1010 of this embodiment of the invention is specifically arranged to detect coded data recorded on a surface for use in sending instructions to a computing system. Such coded data includes location tags printed on the surface in infrared absorptive ink. Each printed location tag includes encoded region identity data which identifies an identity of a region on the surface in which the tag is printed (e.g. if the tag is printed on a sheet of paper this data may identify the sheet of paper), and location data identifying a location of the tag within the region. The location tags also include target structures which allow their detection and enable calculation of the three-dimensional orientation of the pen relative to the surface on which the tag is printed (e.g. tilt with respect to the surface). The tag may also contain various control data.

The code sensor attachment 1010 is arranged to determine the position of the image sensor 132, and thereby the position of the nib, by imaging, in the infrared spectrum, an area of the surface in the vicinity of the nib. It records the location data from the nearest location tag, and is arranged to calculate the distance of the image sensor 132, and thereby the distance of the nib, from an imaged location tag. The controller chip 134 calculates the orientation of the pen and the nib-to-tag distance from the perspective distortion observed on the imaged tag.

Control data from the location tag may include control bits instructing the code sensor to activate its "active area" LED (one of the status LEDs 116). Thus, a region on the surface which corresponds to the active area of a button or hyperlink may be encoded to activate this LED, giving the user of the code sensor visual feedback that the button or hyperlink is active when the nib passes over it.

Movements made relative to a surface with an implement which has an attached code sensor are typically captured as a series of strokes. A stroke consists of a sequence of time-stamped pen positions on the surface, initiated by a pen-down event and completed by a subsequent pen-up event. The pen force can be interpreted relative to a threshold to indicate whether the pen is "up" or "down", or can be interpreted as a continuous value, for example when the pen is capturing a signature. The sequence of captured strokes is hereinafter referred to as "digital ink". Digital ink can be used with a computing system to form the basis for the digital exchange of drawings and handwriting, for on-line recognition of handwriting, and for on-line verification of signatures.

Utilizing the RF chip 133 and antenna 112 the code sensor can transmit the digital ink data (which is encrypted for security and packaged for efficient transmission) to the computing system.

When the code sensor is in range of a receiver, the digital ink data is typically transmitted as it is formed. When the code sensor moves out of range, digital ink data is buffered within the code sensor and can be transmitted later. The DRAM 148, if 512 KB, can hold digital ink of approximately 12 minutes' duration.

The various operations of the code sensor attachment 1010 will now be described in more detail in the following sections.

Figure 14:
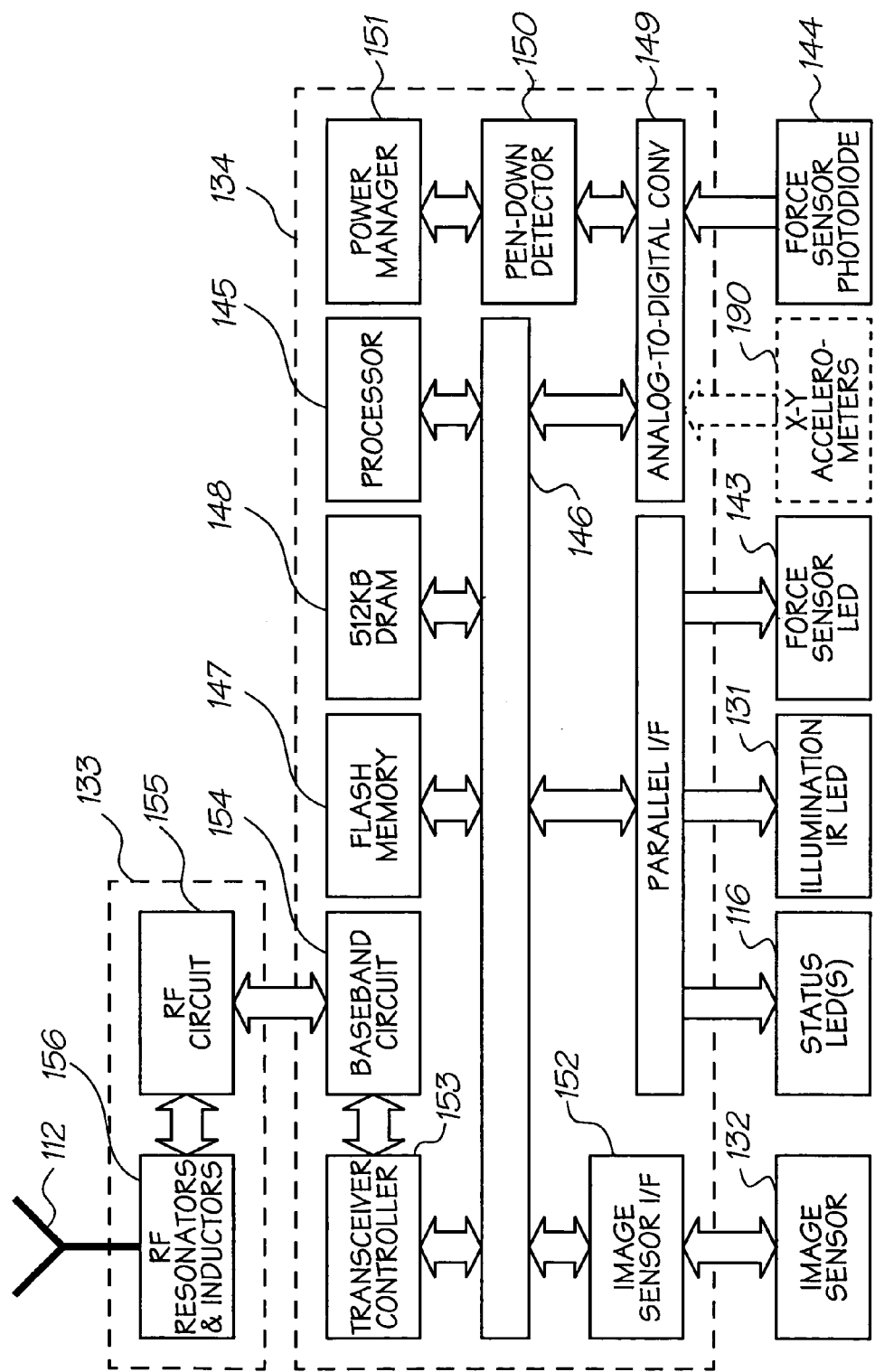
FIG. 14 is a schematic block diagram of a controller for the netpage code sensor attachment.

As discussed above, the controller chip 134 is mounted on the PCB 1034. FIG. 14 is a block diagram illustrating in more detail the architecture of the controller chip 134. FIG. 14 also shows representations of the RF chip 133, the image sensor 132, the status LEDs 116, the IR illumination LED 131, the force sensor LED 143, and the force sensor photodiode 144.

The pen controller chip 134 includes a controlling processor 145. Bus 146 enables the exchange of data between components of the controller chip 134. Flash memory 147 and a 512 KB DRAM 148 are also included. An analog-to-digital converter 149 is arranged to convert the analog signal from the force sensor photodiode 144 to a digital signal.

An image sensor interface 152 interfaces with the image sensor 132. A transceiver controller 153 and baseband circuit 154 are also included to interface with the RF chip 133 which includes an RF circuit 155 and RF resonators and inductors 156 connected to the antenna 112.

The controlling processor 145 captures and decodes location data from tags from the surface via the image sensor 132, monitors the force sensor photodiode 144, controls the LEDs 116, 131 and 143, and handles short-range radio communication via the radio transceiver 153. It is typically a medium-performance (~40 MHz) general-purpose RISC processor.

The processor 145, digital transceiver components (transceiver controller 153 and baseband circuit 154), image sensor interface 152, flash memory 147 and 512 KB DRAM 148 are integrated in a single controller ASIC 134. Analog RF components (RF circuit 155 and RF resonators and inductors 156) are provided in the separate RF chip 133.

The image sensor is typically a CCD with an approximate resolution of 215×215 pixels (such a sensor is produced by Matsushita Electronic Corporation, and is described in a paper by Itakura, K T Nobusada, N Okusenya, R Nagayoshi, and M Ozaki, "A 1 mm 50k-Pixel IT CCD Image Sensor for Miniature Camera System", IEEE Transactions on Electronic Devices, Volt 47, number 1, January 2000, which is incorporated herein by reference) with an IR filter. Alternatively, it may be a CMOS image sensor, and may be integrated with the controller ASIC 134.

The controller ASIC 134 enters a quiescent state after a period of inactivity when the code sensor attachment doesn't detect contact with a surface. It incorporates a dedicated circuit 150 which monitors the force sensor photodiode 144 and wakes up the controller 134 via the power manager 151 on a pen-down event.

The radio transceiver communicates in the unlicensed 900 MHz band normally used by cordless telephones, or alternatively in the unlicensed 2.4 GHz industrial, scientific and medical (ISM) band, and uses frequency hopping and collision detection to provide interference-free communication.

Figure 15:
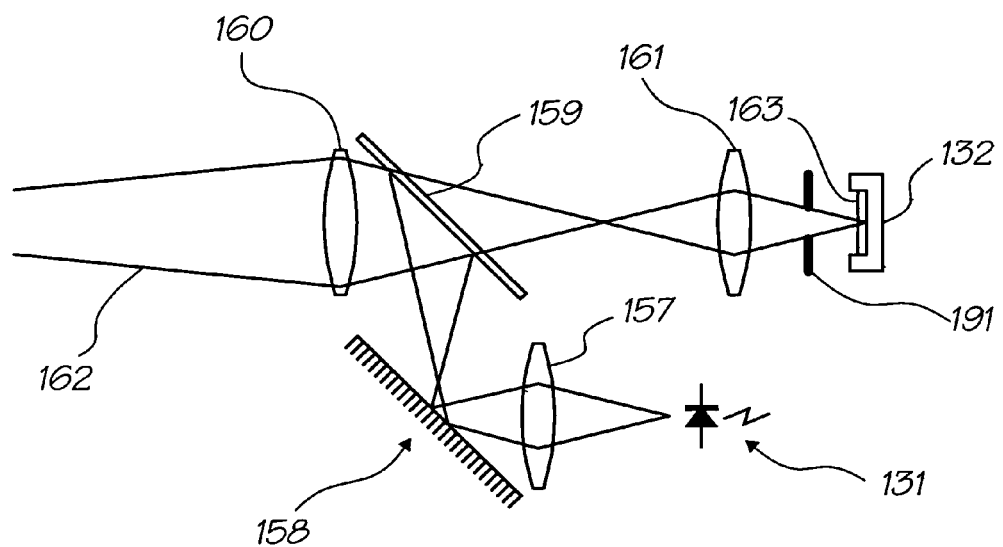
FIG. 15 is a schematic view of a netpage code sensor attachment optical path.

As discussed above, the optics are implemented by a molded optics block 135. The optics implemented by the optics block 135 are illustrated schematically in FIG. 15. The optics block comprises a first lens 157 for focusing illumination from the infrared LED 131, a mirror 158, a beam splitter 159, an objective lens 160 and a second lens 161 for focusing an image onto the image sensor 132. Axial rays 162 illustrate the optical path.

The optical path is designed to deliver a sharp image to the image sensor 132 of that part of the imaged surface which intersects the field of view cone, within required tilt ranges. The primary focusing element is the objective lens 160. This is also used in reverse to project illumination from the IR illumination LED 131 onto the surface within the field of view. Since it is impractical to place both the image sensor 132 and the IR LED 131 at the focus of the objective, a beam splitter 159 is used to split the path and separate relay lenses 157 and 161 in each path provides refocusing at the image sensor 132 and the IR LED 131 respectively. This also allows different apertures to be imposed on the two paths. Alternatively, separate optical paths may be provided for illumination and image capture.

The edges of the image sensor 132 act as the field stop for the capture field, and the capture path is designed so that the resulting object space angular field of view is as required (i.e. just under 20° for the application of this embodiment—see later). The illumination path is designed to produce the same object space field of view as the capture path, so that the illumination fills the object space field of view with maximum power and uniformity.

The IR LED 131 is strobed in synchrony with frame capture. The use of focused illumination allows both a short exposure time and a small aperture. The short exposure time prevents motion blur, thus allowing position tag data capture during pen movement. The small aperture allows sufficient depth of field for the full range of surface depths induced by tilt. The capture path includes an explicit aperture stop 191 for this purpose.

Because the image sensor 132 typically has a strong response throughout the visible and near-infrared part of the spectrum, it is preceded by an infrared filter 163 in the capture path so that it captures a clean image of the tag data on the surface, free from interference from other graphics on the surface which may be printed using inks which are transparent in the near-infrared.

When the nib is in contact with a surface the code sensor determines its position and orientation relative to the surface at 100 Hz to allow accurate handwriting recognition (see the article by Tappert, C, C Y Suen and T Wakahara, "The State of the Art in On-Line Hand Writing Recognition" IEEE Transactions on Pattern Analysis and Machine Intelligence, Vol 12, number 8, August 1990, the disclosure of which is incorporated herein by reference). The force sensor photodiode 144 is utilized to determine, relative to threshold value, whether the pen is "up" or "down". The force may also be captured as a continuous value, as discussed above, to allow the full dynamics of a signature to be verified, for example.

The code sensor determines the position and orientation of its nib on the surface by imaging, in the infrared spectrum, an area of the surface in the vicinity of the nib. It decodes the nearest tag data and computes the position of the nib relative to the location tag from the observed perspective distortion on the imaged tag and the calibrated and known geometry of the implement, the attached code sensor, and the code sensor's optical path. Although the position resolution of the tag may be low, the adjusted position resolution is quite high, and easily exceeds the 200 dpi resolution required for accurate handwriting recognition (see above reference).

As an alternative to locating and decoding tags at the required motion tracking rate (e.g. 100 Hz), it is possible to locate and decode tags at a significantly lower rate (e.g. 10 Hz), and instead use inter-frame correlation techniques to track motion. In this approach, pairs of successively captured frames are compared to identify common patterns and, from their inter-frame displacement, a motion vector. This approach can break down if tilt varies rapidly. It is therefore important to model the rate of change of tilt and to locate and decode tags at a corresponding rate. Alternatively, rapid tilt change can be accommodated within an inter-frame correlation scheme if the scheme actively tracks features such as tag targets from one frame to the next. The advantage of inter-frame correlation techniques is that they are less compute-intensive than full tag decoding. They may also be used with lower-resolution or smaller captured images.

As mentioned above, movements made relative to a surface with an implement which has an attached code sensor are typically captured as a series of strokes. A stroke consists of a sequence of time-stamped pen positions on the surface, initiated by a pen-down event and completed by the subsequent pen-up event. A stroke is also tagged with the region ID of the surface whenever the region ID changes, i.e. just at the start of the stroke under normal circumstances. As discussed above, each location tag includes data indicative of its position on the surface and also region data indicative of the region of the surface within which the tag lies.

Figure 16:
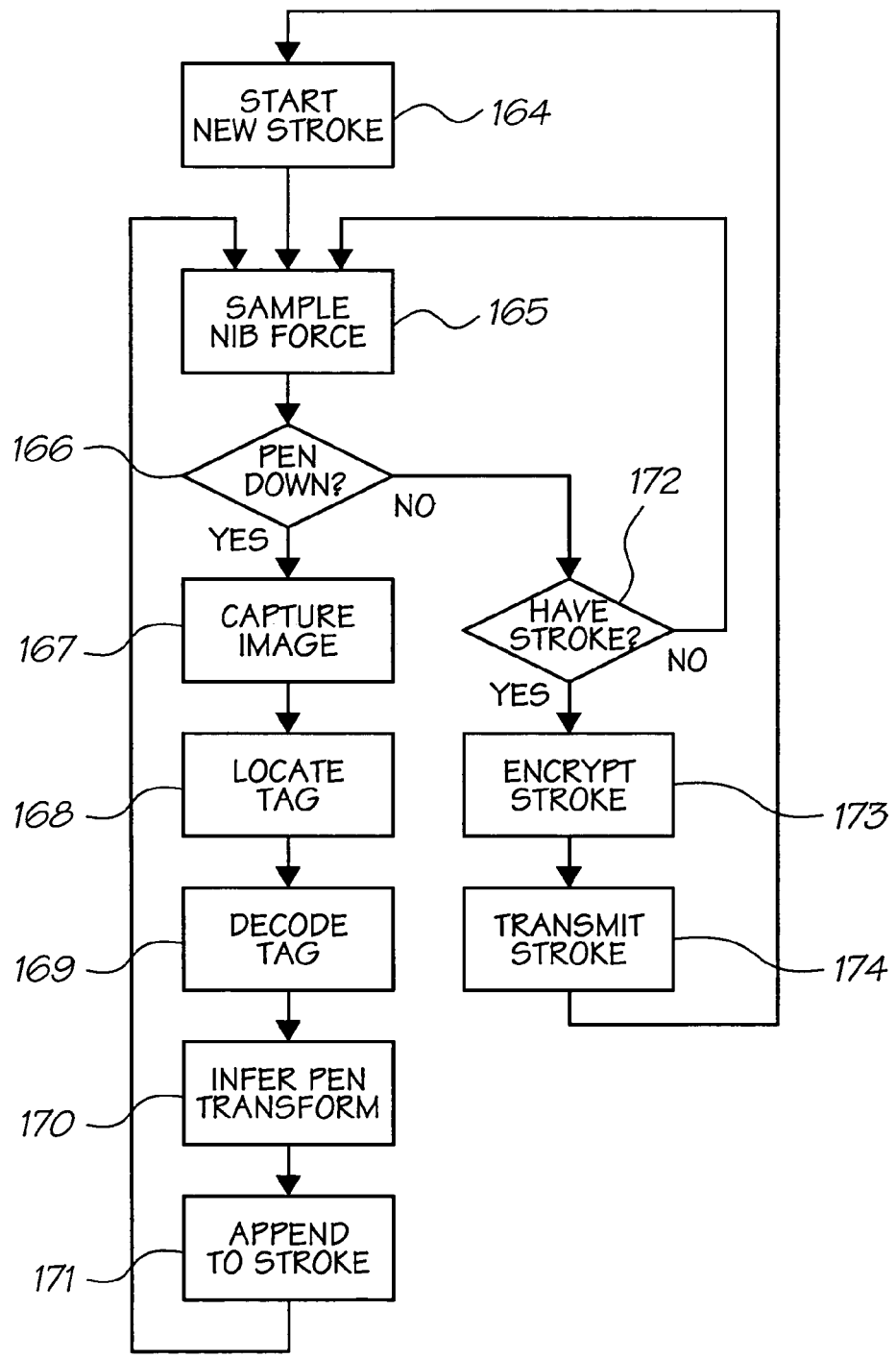
FIG. 16 is a flowchart of a stroke capture algorithm.

FIG. 16 is a diagram illustrating location tag and stroke processing in the code sensor. The pen controller 134 starts with an empty stroke (at 164). It then continuously samples (at 165) the nib force via the force sensor photodiode 144, checking for a pen-down state (at 166). If the pen is in a pen-down state, the pen controller 134 captures (at 167) an image of the surface, locates (at 168) a tag in the captured image, decodes (at 169) tag data from the tag, infers (at 170) the pen position and orientation relative to the surface, and appends (at 171) the position data to the current stroke data. On detection of a pen-up event, i.e. on detection (at 172) of a pen-up state after a pen-down state as indicated by the presence of a non-empty stroke, the pen controller 134 encrypts (at 173) the stroke data and transmits (at 174) the stroke data via the RF chip 133 and antenna 112, to the computing system. It then starts with another empty stroke (at 164).

Assuming a reasonably fast 8 bit multiply (3 cycles), the processing algorithm uses about 80% of the processor's time when the pen is active.

If the code sensor is out of range of a computing system to transmit to, then it buffers digital ink in its internal memory. It transmits any buffered digital ink when it is next within range of a computing system. When the pen's internal memory is full the pen ceases to capture digital ink and instead flashes its error LED 116 whenever the user attempts to write with the implement which has the code sensor attached.

Figure 17:
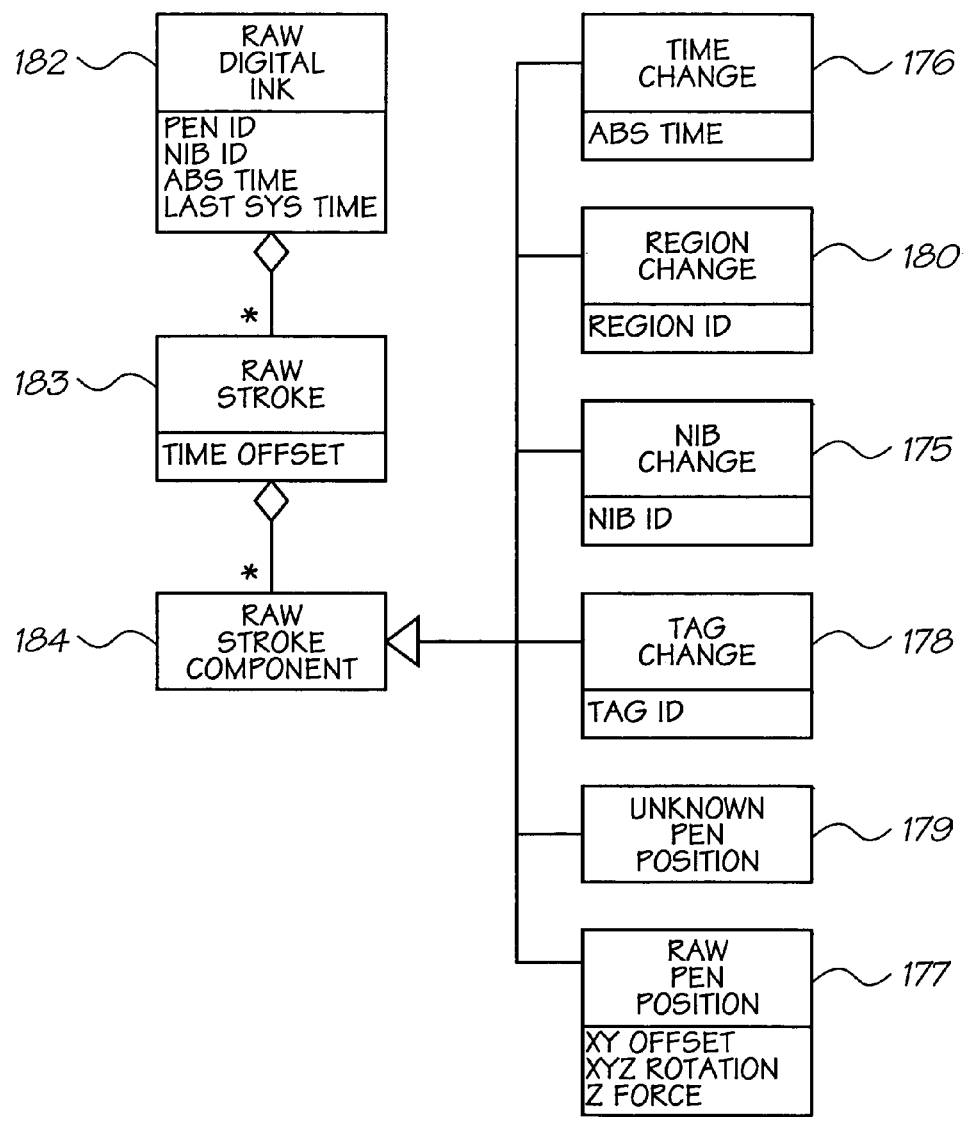
FIG. 17 is a schematic view of a raw digital ink class diagram.
Figure 18:
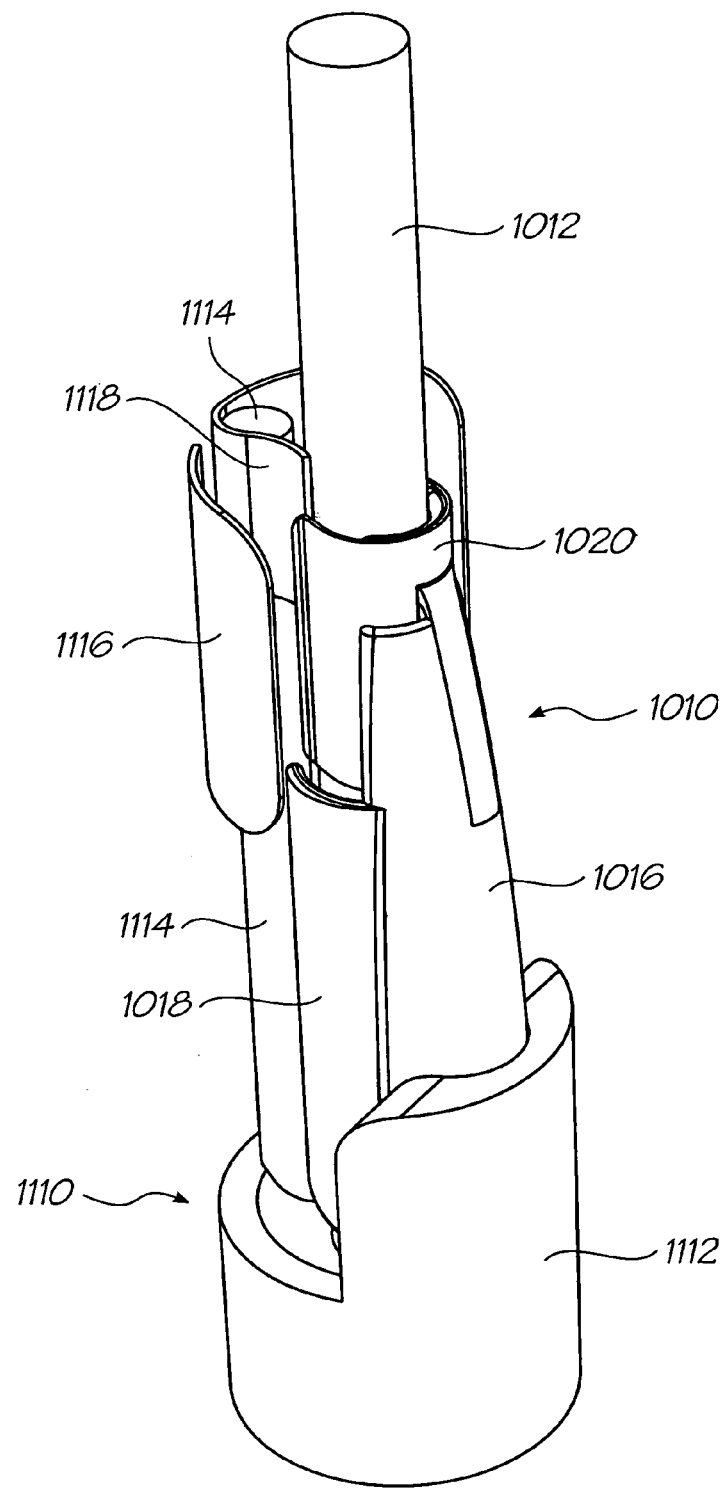
FIG. 18 is a perspective view of the netpage code sensor attachment housed in a base according to the present invention.
Figure 19:
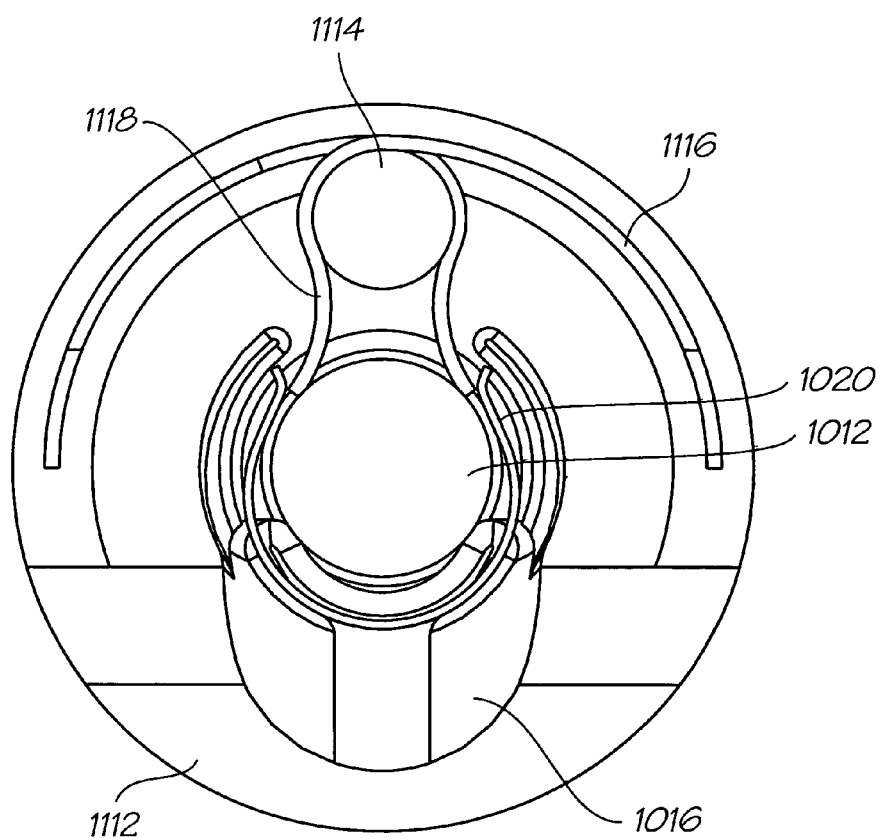
FIG. 19 is a plan view of the netpage code sensor attachment housed in the base.
Figure 20:
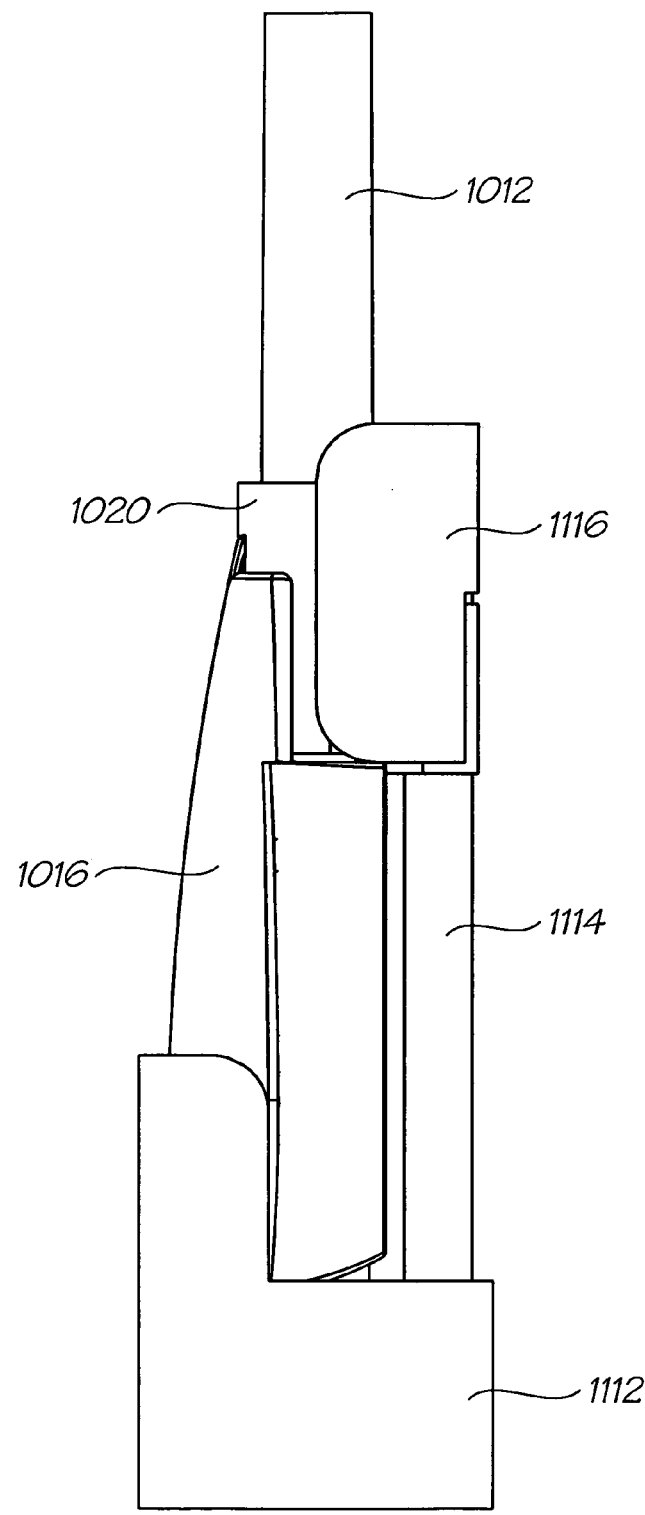
FIG. 20 is a side elevation of the netpage code sensor attachment housed in the base.
Figure 21:
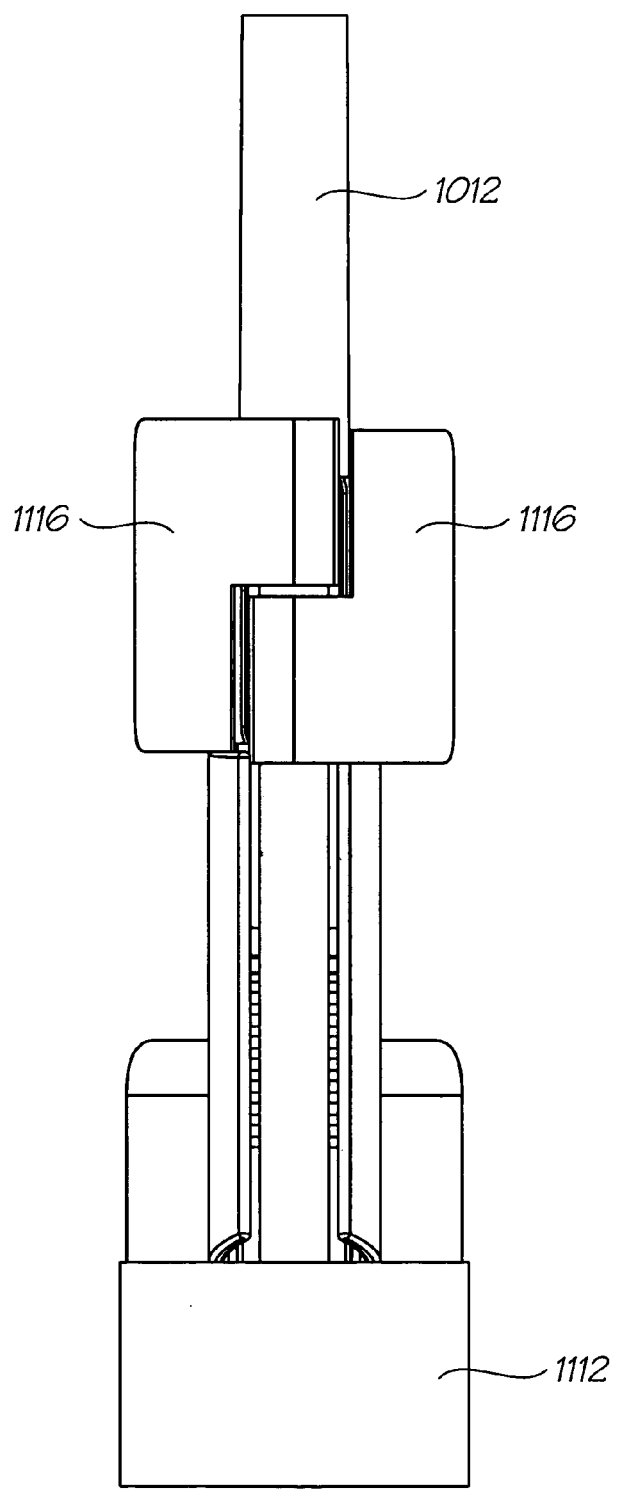
FIG. 21 is a front elevation of the netpage code sensor attachment housed in the base.
Figure 22:
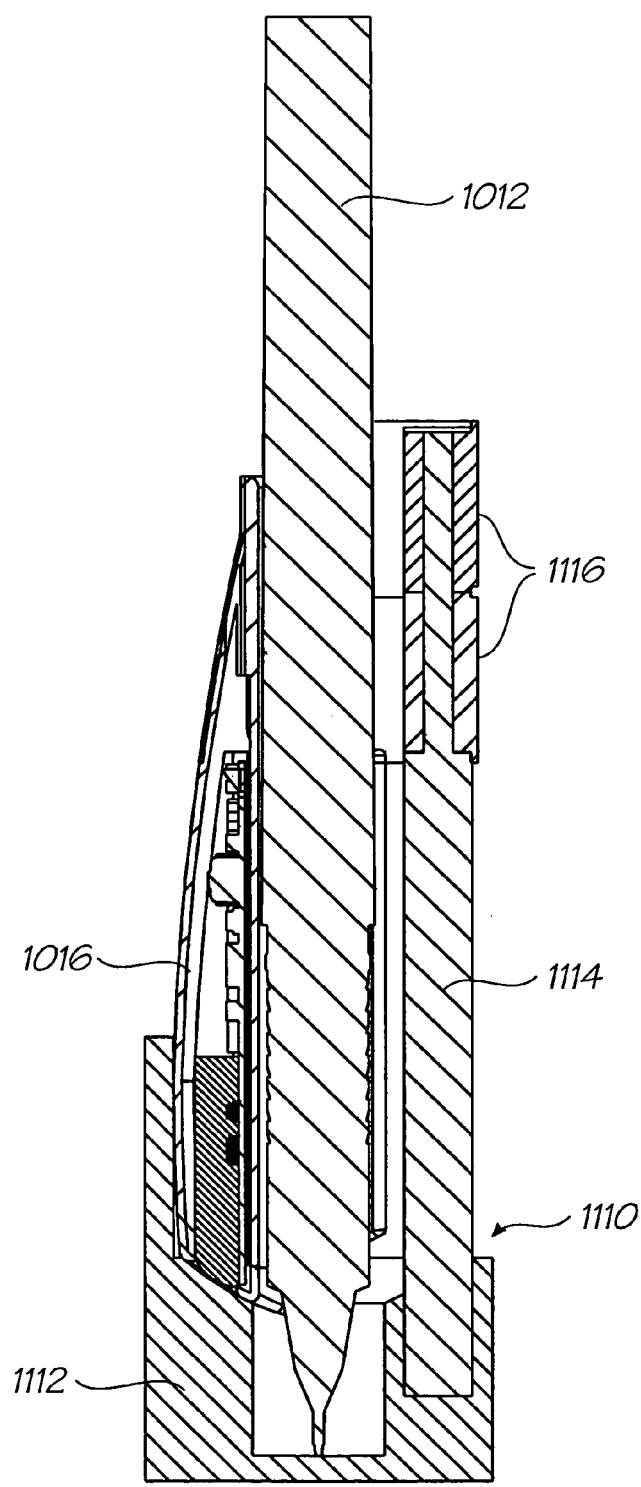
FIG. 22 is a cross section of the netpage code sensor attachment and base, with the attachable sensing device housed in the base.

FIG. 17 is a diagram illustrating the structure of the raw digital ink transmitted from the code sensor to the computing system. Digital ink which is buffered in the code sensor when it is working offline is stored in the same form as digital ink which is transmitted to the system.

When the code sensor connects to the computing system, the controller 134 notifies the system of the pen ID, nib ID, current absolute time, and the last absolute time it obtained from the system prior to going offline. This allows the system to compute any drift in the pen's clock and timeshift any digital ink received from the code sensor accordingly. The code sensor then synchronizes its real-time clock with the accurate real-time clock of the system. The pen ID allows the computing system to identify the code sensor when there is more than one pen being operated with the computing system. Pen IDs may be important in systems which use the pen to identify an owner of the pen, for example, and interact with that owner in a particular directed manner. In other embodiments this may not be required. The nib ID allows the computing system to identify which nib is presently being used. The code sensor attachment may include a user interface allowing the user to select a nib color and/or style which matches the characteristics of the implement to which the code sensor is attached. The computing system can vary its operation depending upon which nib is being used. For example, if a marking nib is being used the computing system may defer producing feedback output because immediate feedback is provided by the ink markings made on the surface. When a stylus nib is being used, the computing system may produce immediate feedback output.

At the start of a stroke the pen controller 134 records the elapsed time since the last absolute time notified to the system. For each pen position in the stroke, in the form of a raw pen position 177, the controller 134 records the x and y offset of the nib from the current tag, the x, y and z rotation of the pen, and the nib force. It only records the tag ID if it has changed, in the form of a tag change 178. Since the tag frequency is significantly smaller than the typical position sampling frequency, the tag ID is constant for many consecutive pen positions, and may be constant for the entire stroke if the stroke is short.

Since the code sensor samples its position and orientation at 100 Hz, pen positions in a stroke are implicitly clocked at 100 Hz and do not need an explicit timestamp. If the code sensor fails to compute a pen position, e.g. because it fails to decode a tag, it must still record a pen position to preserve the implicit clocking. It therefore records the position as unknown, in the form of an unknown pen position 179, allowing the computing system to later interpolate the position from adjacent samples if necessary.

Since the 32-bit time offset of a stroke has a finite range (i.e. 49.7 days), the code sensor optionally records an absolute time for a stroke, in the form of a time change 176. This becomes the absolute time relative to which later strokes' time offsets are measured.

Since the region ID is constant for many consecutive strokes, the pen only records the region ID when it changes, in the form of a region change 180. This becomes the region ID implicitly associated with later pen positions.

Since a user may change the nib between one stroke and the next, the code sensor optionally records a nib ID for a stroke, in the form of a nib change 175. This becomes the nib ID implicitly associated with later strokes.

Each component of a stroke has an entropy-coded prefix. A 10 mm stroke of 1 second duration spans two or three tags, contains 100 positions samples, and therefore has a size of about 5500 bits. Online continuous digital ink capture therefore requires a maximum transmission speed of 5.5 Kbps, and offline continuous digital ink capture requires about 40 Kbytes of buffer memory per minute. The code sensor's 512 KB DRAM 48 can therefore hold over 12 minutes of continuous digital ink. Time, region and nib changes happen so infrequently that they have a negligible effect on the required transmission speed and buffer memory. Additional compression of pen positions can reduce transmission speed and buffer memory requirements further.

Each raw stroke is encrypted using the Triple-DES algorithm (see Schneier, B, Applied Cryptography, Second Edition, Wiley 1996, the disclosure of which is incorporated herein by reference) before being transmitted to the computing system. The pen and computing system exchange session keys for this purpose on a regular basis. Based on a conservative estimate of 50 cycles per encrypted bit, the encryption of a one-second 5500 bit stroke consumes 0.7% of the processor's 45 time.

The combined geometry of the code sensor attachment and the implement to which it is attached is somewhat constrained by the requirements of the optics. An alignment tool is therefore provided in the form of a base 1110 which simultaneously receives the code sensor attachment 1010 and the implement 1012, allowing the former to be attached to the latter in a controlled manner. The base 1110 is illustrated in FIGS. 18 to 22.

The base consists of a base molding 1112, a metal pivot shaft 1114, an paired levers each consisting of a grip 1116 and an arm 1118. The paired levers wrap around the pivot shaft 1114 with the arms 1116 projecting inwards to form a guide which marries with the longitudinal slot in the code sensor attachment's metal clamp 1020. The base molding is arranged to receive the code sensor attachment 1010 vertically, guided by the lever arms 1116.

Once the code sensor attachment is seated in the base, application of force to the lever grips 1118 forces the lever arms 1116 apart, thus opening the metal clamp 1020 and readying it for receiving the implement 1012. When the implement is inserted vertically through the open clamp 1020, it decends until its nib rests on the internal floor of the base molding. The base molding holds the code sensor attachment in a slightly elevated position with respect to the floor, ensuring an ideal distance from the code sensor attachment's optics 135 and the implement's nib.

Releasing the lever grips 1118 allows the clamp 1020 to close, firmly attaching the code sensor attachment 1010 to the implement 1012. The implement can then be removed from the base, with the code sensor attached, ready to be used.

The base 1110 helps ensure gross calibration of the code sensor optics. Fine calibration can then be performed as follows. The geometry is as defined in our co-pending application U.S. Ser. No. 09/575,154.

The geometry of a pen can be automatically calibrated by determining how the sensed viewing distance varies with sensed pen orientation. This can be useful when the geometry is not known a priori, such as when the code sensor attachment has just been attached to an implement.

Assuming a point-like rather than curved nib, the geometry is defined by a three-dimensional vector from the viewpoint to the nib. Assuming, as before, that the optical axis and the nib lie in a known pitch plane, calibration involves sensing the surface at two different pitch values, determining the lines of intersection between the pitch plane and the surface at these pitch angles, and then determining the point of intersection of these lines. The point of intersection is the point of the nib.

Figure 23:
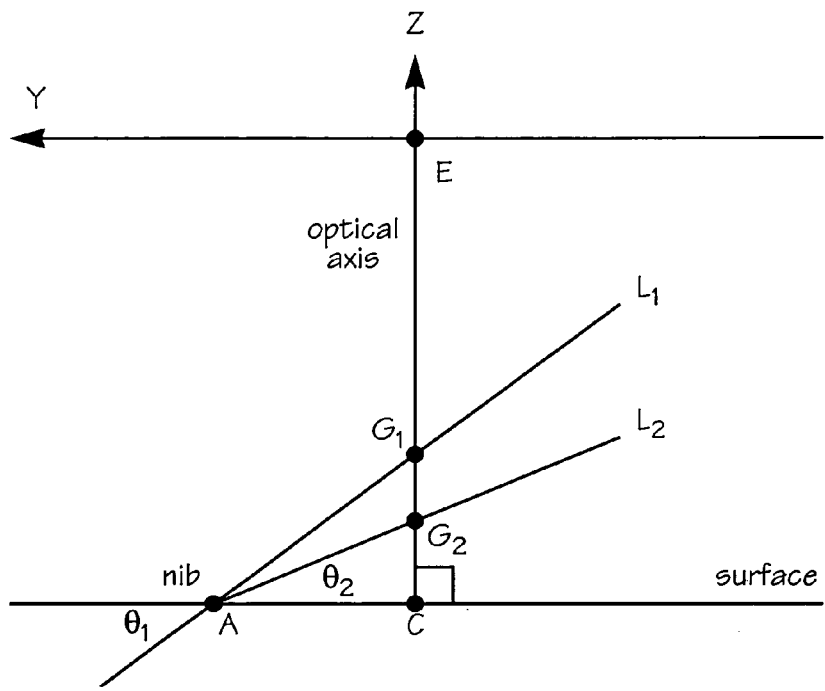
FIG. 23 is a schematic view of the calibration of point nib geometry.

FIG. 23 shows sensor space with the viewpoint E at the origin and the point of the nib A at point (S, D), where D is the viewing distance and S is the distance from the nib to the center of the field of view window at zero pitch.

Two lines $L_1$ and $L_2$ indicate the surface at different pitch angles $\theta_1$ and $\theta_2$ respectively.

Once the surface has been imaged at a particular pitch angle, the pitch angle $\theta$ and viewing distance I can be inferred from the imaged tag in the usual way.

Lines $L_1$ and $L_2$ are then defined by:

$$z = -y \tan \theta_1 + I_1$$

$$z = -y \tan \theta_2 + I_2$$

Solving for y and z gives the intersection point of the two lines, i.e. the point of the nib:

$$S = y = (I_1 - I_2)/(\tan \theta_1 - \tan \theta_2)$$

$$D = z = (I_1 \tan \theta_2 - I_2 \tan \theta_1)/(\tan \theta_1 - \tan \theta_2)$$

The radius R of a spherical nib can be determined by sensing the surface at three pitch angles rather than two, as described below.

Figure 24:
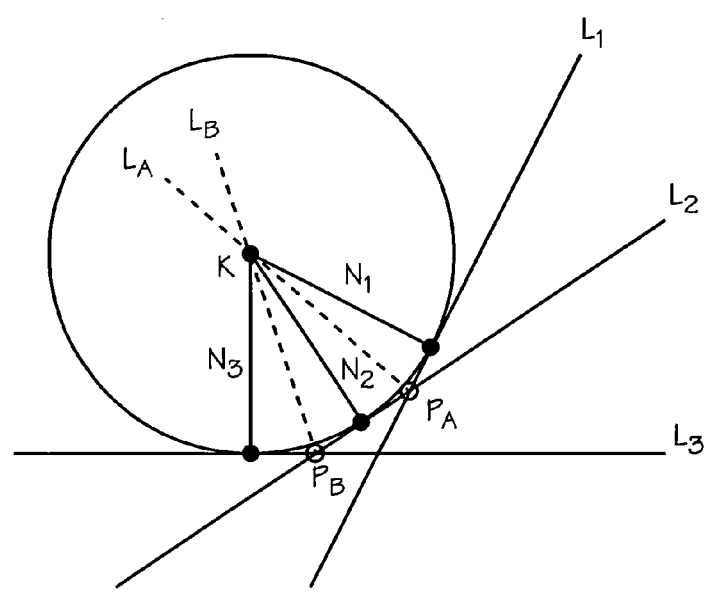
FIG. 24 is a schematic view of the calibration of spherical nib geometry.

FIG. 24 shows three lines $L_1$, $L_2$ and $L_3$ indicating the surface at three different pitch angles. $L_1$ and $L_2$ intersect at $P_A$, while $L_2$ and $L_3$ intersect at $P_B$. Line $L_A$ starts at $P_A$ and has a direction given by the average of the vectors $N_1$ and $N_2$ normal to $L_1$ and $L_2$ respectively. Similarly, line $L_B$ starts at $P_B$ and has a direction given by the average of the vectors $N_2$ and $N_3$ normal to $L_2$ and $L_3$ respectively. Lines $L_A$ and $L_B$ intersect at K, the center of the spherical nib. The minimum distance from K to any of lines $L_1$, $L_2$ and $L_3$ gives the desired radius R.

The convex hull of an arbitrary three-dimensional nib shape can be approximated by sensing the surface at a number of pitch and roll angles. Each pitch, roll and viewing distance triplet uniquely defines a 3D half-space, and the intersection of a collection of such half-spaces approximates the convex hull. The larger the number of orientations at which the surface is sensed, the more closely the intersection approximates the convex hull.

Because the pitch and roll ranges of the pen are limited, the shape of the nib can only be determined within these ranges. However, since these ranges also define the operating ranges of the pen, they allow the nib shape to be determined to the extent required to model the interaction of the nib with the surface within the operating ranges of the pen. This modeling is what is required to precisely track the motion of the nib, as well as to model the shape of the stroke produced by the nib at various orientations.

The calibration technique does not allow the shape of a concave nib to be determined. However, cavities in a nib only affect stroke shape, and not nib motion.

Although the inference of the pen transform as described in the co-pending application U.S. Ser. No. 09/575,154 only takes into account a spherical nib, it can be extended trivially to take into account an arbitrary nib shape defined by an exact or approximating polygon.

After attaching the code sensor attachment, the user calibrates the resulting geometry in conjunction with a special netpage which informs the system that calibration is taking place.

We turn now to alternative embodiments of the coded data and the code sensor attachment.

In a first alternative embodiment, the coded data is indicative of an identity which is data identifying the substrate. This enables the code sensor to identify the substrate, such as whether the substrate is a particular type of document or whether the substrate forms part of another object. Of course, since with this embodiment the tags are indicative of the characteristics of the surface and not the location of the tags relative to the surface, separate means are required for sensing movement of the apparatus relative to the surface.

In a second alternative embodiment, the coded data is indicative of an identity which is data indicative of the tag type. The code sensor can then identify whether the tag represents an object of interest rather than a position on the surface. For example, if the tag represents an object and corresponds to a user interface input element (e.g. a command button), then the tag can directly identify the input element.

A suitable separate movement sensing means for use with the alternative embodiments includes a pair of orthogonal accelerometers 190 mounted in a plane normal to the code sensor axis. The accelerometers 190 are shown in FIG. 14 in ghost outline.

The provision of the accelerometers enables this embodiment of the code sensor to sense motion without reference to surface tags, allowing the tags to be sampled at a lower rate.

The acceleration measured by the accelerometers in each of the X and Y directions is integrated with respect to time to produce an instantaneous velocity and position.

Since the starting position of the stroke is not known, only relative positions within a stroke are calculated. Although position integration accumulates errors in the sensed acceleration, accelerometers typically have high resolution, and the time duration of a stroke, over which errors accumulate is short.

Instead of providing accelerometers to sense motion relative to the surface, alternative motion sensing means may be provided. Such means include motion sensing means which includes an optical sensor which cooperates with the surface to generate signals indicative of movement of the optical sensor relative to the surface, motion sensing means which includes at least two contacts arranged to contact the surface and sense movement in two orthogonal directions, or any other suitable motion sensing means for sensing movement relative to a surface.

The present invention has been described with reference to a preferred embodiment and number of specific alternative embodiments. However, it will be appreciated by those skilled in the relevant fields that a number of other embodiments, differing from those specifically described, will also fall within the spirit and scope of the present invention. Accordingly, it will be understood that the invention is not intended to be limited to the specific embodiments described in the present specification, including documents incorporated by cross-reference as appropriate. The scope of the invention is only limited by the attached claims.

The invention claimed is:

1. A sensing device for use with a surface having coded data disposed on the surface, the coded data being indicative of an identity of a region associated with the surface, said device including a detector arranged to detect the coded data and to generate region identity data indicative of the identity of the region using the coded data, and an attachment arrangement adapted to facilitate attachment and detachment of the device to and from a writing implement having a nib, the sensing device being adapted to sense coded data at least when the nib is in contact with the surface the, nib adapted to mark the surface, the sensing device further including a calibrator for calibrating the device.

2. A sensing device as claimed in claim 1, wherein the attachment arrangement means is a clamp.

3. A sensing device as claimed in claim 1, further including an orientation mechanism for ensuring correct orientation of the device when the writing implement is held by a user during use.

4. A sensing device as claimed in claim 3, wherein said orientation mechanism is a grip portion configured so as to correspond with a portion of a user's hand.

5. A sensing device as claimed in claim 1, wherein the calibrator is configured such that information indicative of the distance between a writing portion of the writing implement and the detector is incorporated into said region identity data.

6. A sensing device as claimed in claim 1, wherein the attachment arrangement is adapted to facilitate attachment of the device to a pen or marker.

7. A sensing device as claimed in claim 1, wherein the attachment arrangement is adapted to facilitate attachment of the device to a pencil.

8. A sensing device as claimed in claim 1, further including a motion sensor configured to generate movement data indicative of movement of the sensing device relative to the region.

9. A sensing device as claimed in claim 8, wherein the motion sensor is configured to generate the movement data using the coded data.

10. A sensing device as claimed in claim 8, wherein the motion sensor includes at least one acceleration sensor, the acceleration sensor being configured to sense acceleration of the sensing device as the sensing device moves relative to the region, the motion sensor being configured to generate the movement data by periodically sampling the acceleration.

11. A sensing device as claimed in claim 10, wherein the acceleration sensor is configured to sense at least two substantially orthogonal components of acceleration.

12. A sensing device as claimed in claim 1, wherein the coded data includes a plurality of tags, each tag being indicative of an identity of a region within which the tag lies.

13. A system for capturing information applied freehand, said system including a sensing device as claimed in claim 1, and a surface having coded data associated with the surface.

14. The sensing device as claimed in claim 1, the sensing device adapted to communicate wirelessly with a processing system.

* * * * *